United States Patent
Lee et al.

(10) Patent No.: US 10,287,376 B2
(45) Date of Patent: May 14, 2019

(54) ANISOTROPIC AND AMPHIPHILIC PARTICLES AND METHODS FOR PRODUCING AND USING THE SAME

(71) Applicant: The Trustees of the University of Pennsylvania, Philadelphia, PA (US)

(72) Inventors: Daeyeon Lee, Wynnewood, PA (US); Fuquan Tu, Philadelphia, PA (US)

(73) Assignee: The Trustee of the University of Pennsylvania, Philadelphia, PA (US)

( * ) Notice: Subject to any disclaimer, the term of this patent is extended or adjusted under 35 U.S.C. 154(b) by 0 days.

(21) Appl. No.: 15/404,549

(22) Filed: Jan. 12, 2017

(65) Prior Publication Data

US 2017/0129978 A1 May 11, 2017

Related U.S. Application Data

(63) Continuation of application No. 14/687,266, filed on Apr. 15, 2015, now Pat. No. 9,580,520.

(60) Provisional application No. 61/979,745, filed on Apr. 15, 2014.

(51) Int. Cl.
| | |
|---|---|
| *C08F 212/08* | (2006.01) |
| *C08F 8/00* | (2006.01) |
| *C08F 220/06* | (2006.01) |
| *C08J 3/05* | (2006.01) |

(52) U.S. Cl.
CPC .............. *C08F 212/08* (2013.01); *C08F 8/00* (2013.01); *C08F 220/06* (2013.01); *C08J 3/05* (2013.01); *C08J 2325/06* (2013.01); *C08J 2333/02* (2013.01)

(58) Field of Classification Search
CPC ......... C08F 212/08; C08F 220/06; C08J 3/05; C08J 2325/06; C08J 2333/02

USPC ........................................................ 524/556
See application file for complete search history.

(56) References Cited

FOREIGN PATENT DOCUMENTS

CN 101885813 11/2010

OTHER PUBLICATIONS

Lu et al., ACS Macro Letters, 3, 346-352, 2014. (Year: 2014).*
Non Final Office Action for U.S. Appl. No. 14/687,266, dated May 25, 2016, 8 pages.
Final Office Action for U.S. Appl. No. 14/687,266, dated Jul. 27, 2016, 9 pages.
Notice of Allowance for U.S. Appl. No. 14/687,266, dated Oct. 12, 2016, 10 pages.
Tang et al., "Large Scale Synthesis of Janus Submicrometer Sized Collids by Seeded Emulsion Polymerization", Macromolecules, vol. 43,, 2010, pp. 5114-5120.
Kim et al., Synthesis of Nonspherical C olloidal Particles with Anistropic Properties, J. Am Chem. Soc., vol. 128, 2006, pp. 14374-14377.
Kim et al., "Colloid Surfactants for Emulsion Stabilizatin", Adv. Materials, vol. 20, 2008, pp. 3239-3243.

* cited by examiner

*Primary Examiner* — Hui H Chin
(74) *Attorney, Agent, or Firm* — BakerHostetler

(57) ABSTRACT

A method for producing an amphiphilic particle or an anisotropic particle includes combining seed particles with a monomer emulsion to obtain monomer-swollen seed particles, polymerizing the monomer-swollen seed particles to obtain polymerized monomer-swollen particles, and hydrolyzing the polymerized monomer-swollen particles. An amphiphilic particle is adapted to stabilize a first type of multiphasic mixture comprising a first aqueous phase having a first pH and a second type of multiphasic mixture comprising a second aqueous phase having a second pH.

4 Claims, 21 Drawing Sheets

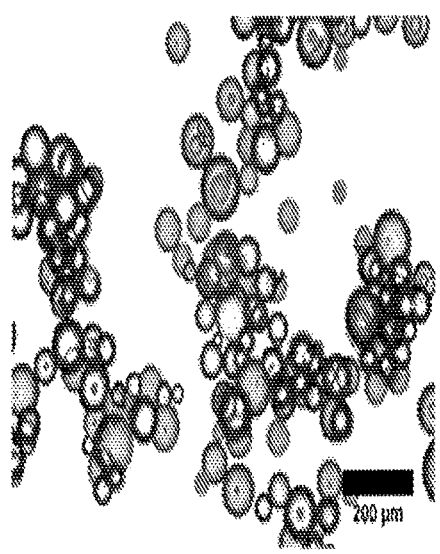
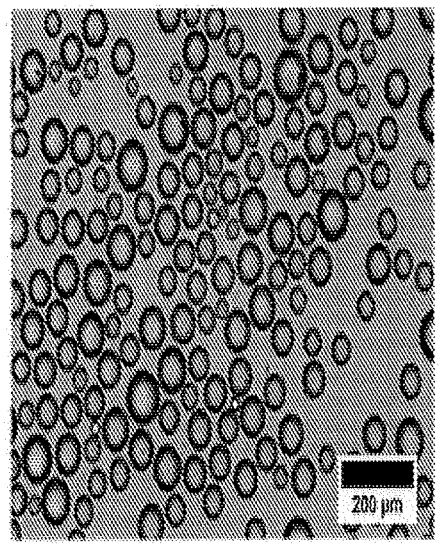
FIG. 6a
FIG. 6b

ANISOTROPIC AND AMPHIPHILIC PARTICLES AND METHODS FOR PRODUCING AND USING THE SAME

CROSS-REFERENCE TO RELATED APPLICATIONS

This application is a continuation of U.S. application Ser. No. 14/687,266, filed Apr. 15, 2015 entitled ANISOTROPIC AND AMPHIPILIC PARTICLES AND METHODS FOR PRODUCING AND USING THE SAME and claims priority to U.S. Provisional application Ser. No. 61/979,745 entitled Amphiphilic Particles and Methods for Producing and Using the Same, filed on Apr. 15, 2014, the contents of which are incorporated fully herein by reference.

STATEMENT REGARDING FEDERALLY SPONSORED RESEARCH

This invention was made with government support under Contract Agreement No. DMR1120901 awarded by the National Science Foundation. The Government has certain rights in this invention.

FIELD OF THE INVENTION

This invention relates to anisotropic and amphiphilic particles, processes for producing such particles, and the use of such particles for stabilizing multiphasic mixtures.

BACKGROUND OF THE INVENTION

Amphiphilic Janus particles are biphasic colloids that have two sides with distinct chemistry and wettability. Because of their amphiphilicity, Janus particles have particular utility with respect to stabilizing multiphasic fluid mixtures such as emulsions. Studies have shown that Janus particles offer advantages over their homogenous counterparts as solid surfactants. For example, the adsorption energy of a spherical Janus particle to an oil-water (OW) interface can be as large as three times that of its homogenous counterpart. Thus, Janus particles have a strong tendency to segregate to and remain at fluid interfaces.

The behavior and function of Janus particles as surface active agents may depend upon the shape of the Janus particles as well as their amphiphilicity. Certain amphiphilic particles can change their shape and amphiphilicity in response to external stimuli such as temperature, pH and light, which in turn change the particles' properties and functionality as surface active agents. The so-called stimuli-responsive amphiphilic particles described in previous studies have limited ranges of amphiphilicity- and shape-tunability and, thus, cannot be used for inducing phase inversion of emulsions or for stabilizing different types of emulsions.

Thus, it would be useful to provide pH-responsive Janus particles that can switch their amphiphilicity due to changes in shape and chemistry. There is also a need for a Janus particle that may be used to stabilize different types of multiphasic mixtures. Further, it would be desirable to provide an amphiphilic particle that may also be used to induce a phase inversion of multiphasic mixtures in response to changes in the pH of the aqueous layer. It would also be desirable to provide an amphiphilic particle that may be used to induce a phase inversion of multiphasic mixtures in response to changes in the volume fraction of a component phase of the mixtures. Additionally, it would be desirable to provide a method by which both amphiphilic Janus particles and general anisotropic particles for stabilizing emulsions can be generated. Finally, it would be desirable to provide a pH-responsive Janus particle which permits adjustment of the interactions between oil-in-water emulsion droplets without inducing destabilization.

SUMMARY OF THE INVENTION

Aspects of the invention relate to methods for producing amphiphilic particles, amphiphilic particles produced by the inventive methods, amphiphilic particles adapted for a particular purposes, methods for inverting a first type of multiphasic mixture into a second type of multiphasic mixture, and methods for producing large quantities of anisotropic particles.

In accordance with one aspect, the invention provides a method for producing an amphiphilic particle. The method includes combining seed particles with a monomer emulsion to obtain monomer-swollen seed particles; polymerizing the monomer-swollen seed particles to obtain polymerized monomer-swollen particles; and hydrolyzing the polymerized monomer-swollen particles.

In yet another aspect, the invention provides a method for producing an anisotropic particle. The method includes combining seed particles with a monomer emulsion to obtain monomer-swollen seed particles; polymerizing the monomer-swollen seed particles to obtain polymerized monomer-swollen particles; and hydrolyzing the polymerized monomer-swollen particles.

In accordance with another aspect, the invention provides an amphiphilic particle obtained by the inventive method described above.

In accordance with yet another aspect, the invention provides an amphiphilic particle which is adapted to stabilize a first type of multiphasic mixture which includes a first aqueous phase at a first pH and a second type of multiphasic mixture having a second aqueous phase at a second pH.

In accordance with still another aspect, the invention provides a method for inverting a first type of multiphasic mixture comprising a first aqueous phase and having a first pH into a second type of multiphasic mixture comprising a second aqueous phase and having a second pH. The method includes adding an amphiphilic particle to the first type of multiphasic mixture; and adjusting the first pH of the first aqueous phase to the second pH.

In another aspect, the invention provides a method for inducing a phase inversion in a multiphasic mixture. The method includes adding an amphiphilic particle to the multiphasic mixture; and either changing a volume fraction of a component phase of the multiphasic mixture or changing the pH of the aqueous phase of the multiphasic mixture.

In still another aspect, the invention provides a method for inducing triggered release of encapsulated phases within multiple emulsions upon a change in pH.

BRIEF DESCRIPTION OF THE DRAWINGS

The invention is best understood from the following detailed description when read in connection with the accompanying drawings, with like elements having the same reference numerals. When a plurality of similar elements are present, a single reference numeral may be assigned to the plurality of similar elements with a small letter designation referring to specific elements. When referring to the elements collectively or to a non-specific one or more of the elements, the small letter designation may be dropped. This emphasizes that according to common practice, the various features of the drawings are not drawn to scale unless otherwise indicated. On the contrary, the dimensions of the various features may be expanded or reduced for clarity. Included in the drawings are the following figures:

FIG. 6a is a microscope image of toluene-in-water emulsions made with (Sty50/AA50) Janus particles dispersed in a pH 2.2 aqueous solution in accordance with aspects of the present invention;

FIG. 6b is a microscope image of toluene-in-water emulsions made with (Sty50/AA50) Janus particles dispersed in a pH 11.0 aqueous solution in accordance with aspects of the present invention;

DETAILED DESCRIPTION OF THE INVENTION

Figure 1:
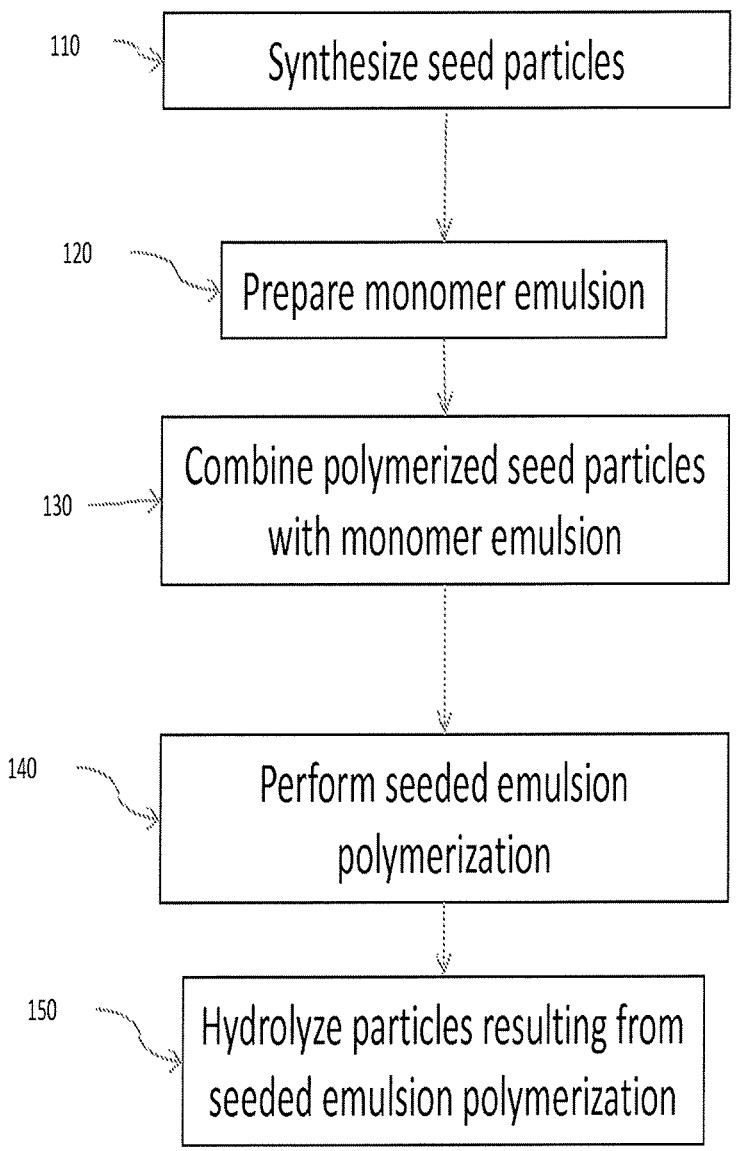
FIG. 1 is a flow diagram of a method for producing amphiphilic or anisotropic particles in accordance with aspects of the present invention.

Aspects of the invention are directed to amphiphilic particles, processes for preparing amphiphilic particles, processes for inverting a first type of multiphasic mixture into a second type of multiphasic mixture, and processes for preparing general anisotropic particles. Processes according to aspects of the invention include mixing seed particles with a monomer emulsion to obtain monomer-swollen seed particles; polymerizing the monomer-swollen seed particles to obtain polymerized monomer-swollen particles; and hydrolyzing the polymerized monomer-swollen particles. In accordance with another process, a method for inverting a first type of multiphasic mixture comprising a first aqueous phase and having a first pH into a second type of multiphasic mixture comprising a second aqueous phase and having a second pH is disclosed which includes adding an amphiphilic particle to the first type of multiphasic mixture; and adjusting the first pH of the first aqueous phase to the second pH. An amphiphilic particle according to the present invention is adapted to stabilize a first type of multiphasic mixture comprising a first aqueous phase having a first pH and a second type of multiphasic mixture comprising a second aqueous phase having a second pH. An amphiphilic particle is also prepared according to the processes described herein.

Amphiphilic particles according to aspects of the invention are pH-responsive (i.e., they respond to changes in the pH of the solution in which they are dispersed) and may be used to stabilize different types of multiphasic mixtures such as emulsions (e.g., oil-in-water and water-in-oil). The amphiphilic particles are able to assemble into different structures depending upon the solution pH and change their aggregation/dispersion behavior. Depending upon the solution pH, the amphiphilic particles may be used to control the interactions between, e.g., oil-in-water emulsion droplets without inducing destabilization. In particular, emulsion droplets with attractive or repulsive interactions can be generated using the amphiphilic particles by changing the pH of the aqueous phase. The amphiphilic particles may also be used to induce a phase inversion of multiphasic mixtures in response to changes in the pH of the aqueous layer. Additionally, the amphiphilic particles are able to stabilize water-in-oil-in-water emulsions and, upon adjustment of the pH of the continuous aqueous phase, cause a release of the encapsulated water droplets.

As used herein, an "amphiphilic particle" refers to a nanoparticle whose surface has two or more distinct types of chemistry, such as one-half of its surface composed of hydrophilic groups and the other half composed of hydrophobic groups (i.e., a Janus particle).

As used herein, a "multiphasic mixture" refers to any mixture of two or more immiscible or miscible fluids including, e.g., foams, gas mixtures, water-in-oil, oil-in-water, or water-in-oil-in-water emulsions.

As used herein, an "anisotropic particle" refers to a particle that is non-spherical in shape. Like amphiphilic particles, an anisotropic particle according to the present invention may be adapted to stabilize emulsions.

As used herein, "hydrophilic-precursor monomers" refer to components that can be converted to a hydrophilic component through acid or base hydrolysis. Exemplary "hydrophilic-precursor monomers" include tert-butyl acrylate (tBA), tert-butyl methacrylate, and tert-butyl acrylamide. Upon reading this disclosure, other hydrophilic-precursor monomers will become evident to those of ordinary skill in the art.

In FIG. 1, a flow diagram depicting selected steps of a process 100 for producing an amphiphilic particle or an anisotropic particle according to aspects of the invention is shown. It should be noted that, with respect to the methods described herein, it will be understood from the description herein that one or more steps may be omitted and/or performed out of the described sequence of the method while still achieving the desired result.

In step 110, seed particles are synthesized. Generally, any hydrophobic polymer is suitable to use as a seed particle. Suitable examples may be found among acrylics, esters, ethers, fluorocarbons, amides, imides, carbonates, dienes, olefins, styrenes, vinyl acetals, vinyls, vinylidene chlorides, vinyl esters, vinyl ethers, ketones vinylpyridine and vinypyrrolidone polymers. In one embodiment, linear polystyrene is used as a seed particle.

Depending on the identity of the seed particle, one of ordinary skill in the art will understand that a variety of synthesis methods may be used. For example, dispersion polymerization may be used to synthesize linear polystyrene seed particles. Other synthesis methods include, without limitation, surfactant free emulsion polymerization, suspension polymerization, miniemulsion polymerization, microemulsion polymerization, macroemulsion polymerization, and precipitation polymerization. An additional synthesis method involves forming an oil-in-water emulsion using a linear polymer of hydrophobic component (e.g., polystyrene) in a volatile solvent such as toluene, and subsequently evaporating the solvent to form seed particles.

In step 120, a monomer emulsion is prepared. The monomer emulsion may desirably include a hydrophobic component and a component that can be converted to a hydrophilic component. Hydrophobic components include methyl methacrylate, bromostyrene, and styrene. The components that can be converted to a hydrophilic component can be converted through acid or base hydrolysis. They may be referred to as "hydrophilic-precursor monomers" for this reason. For example, tert-butyl acrylate (tBA), tert-butyl methacrylate, and tert-butyl acrylamide may be converted into a suitable hydrophilic component using acid hydrolysis. Using base hydrolysis, acrylonitrile may be converted to a suitable hydrophilic component. In one embodiment, the monomer emulsion for production of an amphiphilic particle comprises a mixture of styrene and tBA.

In addition, where the production of amphiphilic (rather than anisotropic) particles is desired, a chemical cross-linking agent is included in the monomer emulsion. Examples of cross-linking agents include divinyl benzene (DVB), elemental sulfur, and bisacrylamide, but others will become apparent to persons of ordinary skill in the art. In an additional embodiment, a non-polymerizable solvent may be included. Without limitation to a particular theory, it is believe that non-polymerizable solvents facilitate phase separation to produce "pure compartments" of hydrophilicity and hydrophobicity on amphiphilic Janus particles. Suitable non-polymerizable solvents include, but are not limited to: toluene, hexane, benzene, and cyclohexane.

Where the production of anisotropic (rather than amphiphilic) particles is desired, the monomer emulsion of step 120 substitutes a non-polymerizable solvent, such as toluene, for the hydrophobic component and lacks a chemical cross-linker. It should be noted that the method embodiments that may produce amphiphilic Janus particles and the embodiments that may produce anisotropic particles differ only in the monomer emulsions prepared at step 120. The process 100 otherwise remains constant.

The seed particles obtained during step 110 and the monomer emulsion obtained during step 120 are combined in step 130. According to an embodiment, the seed particles absorb, i.e., are swollen with, the monomer mixture over a period of time. Seed particle-monomer mixture combination step 130 may be carried out within a Glas-Col® rotator set at 60 rpm for 8 hours. The result of step 130 is monomer-swollen particles.

Seeded emulsion polymerization of the monomer-swollen particles is performed in step 140. The monomer-swollen particles obtained from step 130 may be tumbled in an oil bath. In one embodiment, monomer-swollen particles are tumbled in an oil bath at 70° C. for approximately 10 hours. The result of step 140 is polymerized monomer-swollen particles. If a non-polymerizable solvent (e.g., toluene) is used, it may be evaporated after polymerization.

In step 150, the polymerized monomer-swollen particles undergo hydrolysis. The composition as well as the concentration of the acid may affect the physical and chemical properties, such as amphiphilicity, of the resulting amphiphilic or anisotropic particle. In an exemplary embodiment, the polymerized monomer-swollen particles are hydrolyzed with a mixture of trifluoroacetic acid and formic acid. One of ordinary skill in the art will understand that various acid compositions and concentrations may be used to achieve hydrolysis of the monomer-swollen particles.

It is believed that chemical cross-linking agents play an important role in amphiphilic particle formation. Without intending to be limited to a particular theory, it is believed that cross-linking agents keep a newly-formed hydrophilic polymer "lobe" attached to the hydrophobic "lobe" of the original seed particle to form the two-sided amphiphilic Janus particle.

By contrast, when producing general anisotropic particles, it may be preferable to forgo the addition of chemical cross-linking agent in the monomer emulsion. Without limitation to a particular theory, it is believed that without the chemical cross-linking agent, the hydrophilic polymerized "lobe" will not stay attached to the original hydrophobic "lobe" of the original seed particle, and may instead dissolve and be washed away in a washing step. This is believed to result in general anisotropic particles comprised mainly of the hydrophobic "lobe." The resulting general anisotropic particle, as an alternative embodiment of the invention, may be adapted to stabilize emulsions.

In an alternative embodiment of the invention, an amphiphilic Janus particle is provided. The amphiphilic particle may be obtained from the inventive methods described herein.

The amphiphilic particles of the present invention may also be adapted to stabilize a first type of multiphasic mixture comprising a first aqueous phase having a first pH and a second type of multiphasic mixture comprising a second aqueous phase having a second pH. In particular, the amphiphilic particles may be used to generate thermodynamically stable emulsions. Because the inventive amphiphilic particles comprise two sides with different preferences toward oil and water (i.e., not just the wettability but also swellability in different media), these particles have particular utility as solid surfactants. The shape-changing and amphiphilicity-reversing properties of the inventive amphiphilic particles can change their surfactant properties. That is, for a given solid amphiphile, the type of emulsion that can be stabilized may depend on the amphiphiles shape and amphiphilicity.

The first and second type of multiphasic mixture may be any mixture of two or more immiscible or miscible fluids including g, e.g., foams, gas mixtures, water-in-oil, oil-in-water, or water-in-oil-in-water emulsions.

In an alternative embodiment, an amphiphilic particle is adapted to cause a phase inversion of the first type of multiphasic mixture into the second type of multiphasic mixture by adjusting the pH of the first aqueous layer to a second pH. In this manner, a water-in-oil emulsion may be inverted into an oil-in-water emulsion or vice versa. This phase inversion may be accomplished by adjusting the pH of the continuous aqueous phase from a first pH to a second pH.

In yet another embodiment, an amphiphilic particle is adapted to stabilize a water-in-oil-in-water emulsion, known as a multiple emulsion, which includes encapsulated water droplets. By adjusting the pH of the continuous phase of a water-in-oil-in-water emulsion including the inventive amphiphilic particle, the encapsulated water may be released. Thus, multiple emulsions including the inventive amphiphilic particle has potential utility as delivery vehicles to enable triggered release of active agents such as nutrients, drugs, pesticides, fragrances, and foodstuffs.

In a further embodiment, a method for inverting a first type of multiphasic mixture comprising a first aqueous phase and having a first pH into a second type of multiphasic mixture comprising a second aqueous phase and having a second pH is provided. In one embodiment, the first and second types of multiphasic mixtures are water-in-oil and oil-in-water emulsions or vice versa. It should be noted that the first aqueous phase refers to the aqueous phase of the initial emulsion while the second aqueous phase refers to the aqueous phase of the inverted emulsion.

The method includes the steps of adding an amphiphilic particle to the first type of multiphasic mixture and adjusting the first pH of the first aqueous phase to the second pH.

Additional surfactants and stabilizers that are well-known in the art could be used in conjunction with the inventive amphiphilic particles without eliminating the aforementioned benefits.

EXAMPLES

The following examples are included to demonstrate the overall nature of the present invention. The examples further illustrate the improved results obtained by employing the amphiphilic particles and related processes.

Example 1—Synthesis of Amphiphilic Janus Particles and Anisotropic Particles

Figure 2A:
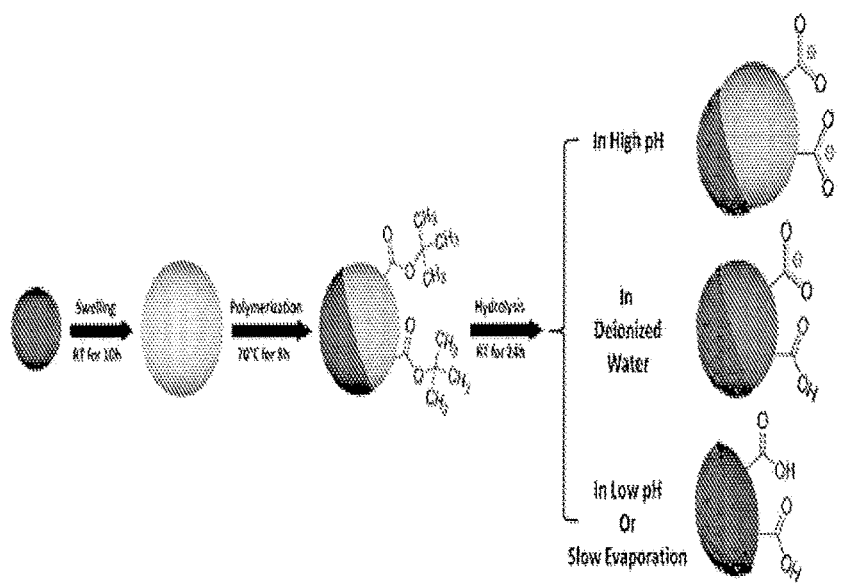
FIG. 2a is a schematic illustration of a method for producing amphiphilic particles in accordance with aspects of the present invention.

Turning to FIG. 2a, a schematic illustration for the synthesis of amphiphilic Janus particles using seeded emulsion polymerization followed by acid hydrolysis is shown.

Figure 2B:
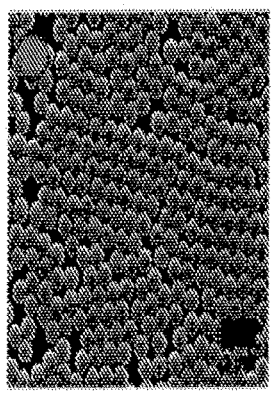
FIG. 2b is a microscope image of linear polystyrene seed particles.

Monodisperse seed particles composed of linear polystyrene are synthesized by dispersion polymerization. 0.03 gram polyvinylpyrrolidone (Mw~55,000) is dissolved in 75 ml isopropyl alcohol (99.9%) in a 100 ml flask. Then 9 ml deionized water containing 0.02 gram ammonium persulfate (98%) as initiator is added to the flask followed by the addition of 6.6 ml styrene (≥99%). After the flask is sealed with a rubber stopper and Teflon® tape, the mixture is thoroughly mixed by shaking the flask for 60 seconds. Subsequently the mixture is purged with nitrogen for 5 minutes. The flask is mounted onto a tumbler (IKA® RW16 basic) and immersed in an oil bath at 70° C. The flask is tumbled at 100 revolutions per minute (rpm) for 24 hours for polymerization. The polymerized linear polystyrene particles are shown in FIG. 2b.

After polymerization, the particles are washed four times with deionized water using centrifugation. 20 wt % linear polystyrene dispersion is prepared by dispersing linear polystyrene particles in 1 wt % poly vinyl alcohol (PVA, Mw 13,000-23,000, 87-89% hydrolyzed) aqueous solution. A 20 wt % monomer emulsion is prepared by vortexing a mixture consisting of styrene, tert-butyl acrylate (98%), 1 vol % divinylbenzene (55%) and 0.5 wt % initiator 2,2'-Azobis (2.4-dimethyl valeronitrile) (V-65B) (Wako) with a 1 wt % PVA aqueous solution. The generation of amphiphilic Janus particles may also be carried out with other monomer emulsions and monomer mixtures. One embodiment uses a single monomer type mixed with one cross-linker type and a non-polymerizable solvent. The single monomer type may be tBA or tBMA. The cross-linker may be one of DVB, bisacrylamide, or elemental sulfur. The non-polymerizable solvent may be one of toluene, hexane, xylene, benzene, or cyclohexane. It is believed that while a non-polymerizable solvent is not necessary to produce amphiphilic Janus particles, the solvent improves phase separation into "pure compartments." Another embodiment forgoes the use of hydrophobic monomers, such as styrene, in the monomer mixture.

Figure 2C:
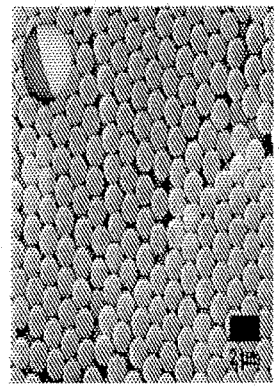
FIG. 2c is a microscope image of P(S-co-tBA)/LPS composite particles in accordance with aspects of the present invention.

Linear polystyrene particles are swollen with the monomer mixture by mixing the LPS dispersion and the monomer emulsion to obtain monomer-swollen linear polystyrene particles. FIG. 2c depicts the resulting monomer-swollen linear polystyrene particles, i.e., P(S-co-tBA)/LPS composite particles.

The volume ratio of the linear polystyrene and the monomer mixture is 20:80. The particle-monomer mixture is mounted on a rotator (Glas-Col®) and rotated for 8 hours at 60 rpm. Seeded emulsion polymerization is performed by tumbling the particle-monomer mixture in an oil bath at 70° C. at 100 rpm for 10 hours. After seed emulsion polymerization, particles are washed with deionized water at least six times by centrifugation to remove poly vinyl alcohol and unreacted monomer. If a non-polymerizable solvent is used, it may be evaporated after polymerization.

Figure 2D:
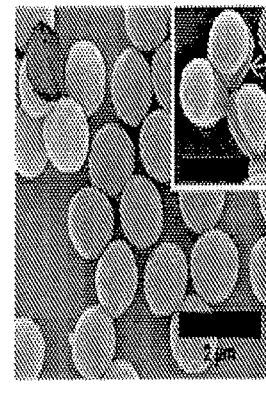
FIG. 2d is a microscope image of (Sty/AA) Janus particles after hydrolysis in accordance with aspects of the present invention.

The particles from seeded emulsion polymerization are then stirred in an acid mixture consisting of 80 vol % trifluoroacetic acid (99%) and 20 vol % formic acid (≥95%) at 1200 rpm for 24 hours for the hydrolysis of tert-butyl acrylate. The volume ratio of particles and acid mixture is 1:40. The hydrolyzed particles are washed with deionized water 10 times by centrifugation. FIG. 2d depicts amphiphilic (Styrene/acrylic acid) Janus particles resulting after the hydrolysis step.

The hydrolyzed particles become acorn shapes with one smooth side and one rough side. This highly asymmetric shape suggests that some type of phase separation occurred within each composite particle during seeded emulsion polymerization. The inset of the image in FIG. 2d shows hydrolyzed composite particles prepared by fast evaporation with the acrylic acid-rich side 210 collapsed. Each Janus particle depicted includes a hydrophilic acrylic acid-rich side 210 and a hydrophobic styrene-rich side 220.

Because the Janus particles may be produced using a monomer mixture containing, e.g., both a hydrophobic monomer and tert-butyl acrylate, the resulting phase separation after hydrolysis may be incomplete. This incomplete phase separation therefore may not result in "pure compartments" of the hydrophobic styrene-rich side and the hydrophilic acrylic acid-rich side. Instead, the acrylic acid-rich side may include some amount of styrene and the styrene-rich side may include some amount of acrylic acid. The impurity of the acrylic acid-rich side and the styrene-rich side may undesirably preclude an asymmetric distribution of nanoparticles in the Janus particles.

Figure 2E:
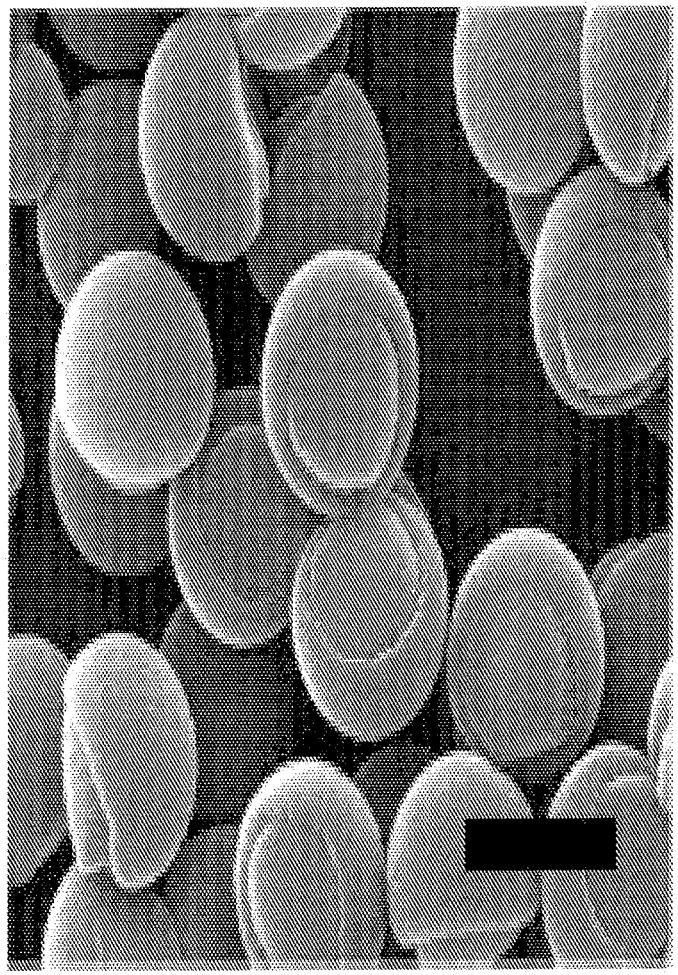
FIG. 2e is a microscope image of (Sty/PMAA) Janus particles after hydrolysis in accordance with aspects of the present invention.

The inventors have, however, discovered methods to optimize the purity of the hydrophilic and hydrophobic sides of Janus particles. One method involves replacing the hydrophobic monomers, such as styrene, with a non-polymerizable solvent such as toluene in the monomer emulsion. Another method involves adding a non-polymerizable solvent to the monomer emulsion with other components. The non-polymerizable solvents, such as toluene, can be removed by evaporation after the polymerization of tBA. Other suitable non-polymerizable solvents may include, but are not limited to: hexane, xylene, benzene, and cyclohexane. Another method includes using polymers having higher glass transition temperatures in the monomer emulsion. The glass transition temperature of the two polymers used in the seeded emulsion polymerization to make the composite particles affects the extent of phase separation. Higher glass transition temperatures result in more distinct phase separation. Poly tert-butyl methacrylate (PtBMA) has a higher glass transition temperature than that of poly tert-butyl acrylate (PtBA). Therefore, the use of tert-butyl methacrylate (tBMA) monomers in seeded emulsion polymerization, as opposed to Cert-butyl acrylate (tBA) monomers, results in a better phase separation. After acid hydrolysis, PtBMA is converted to poly methacrylic acid (PMAA). In FIG. 2e, Janus particles produced via seeded emulsion polymerization followed by acid hydrolysis are depicted. The Janus particles were produced by substituting tBMA monomers in place of tBA monomers. As a result, the phase separation of the resulting particles is improved as indicated by the smooth styrene-rich side of the particles. This results in "pure compartments" of the hydrophilic methacrylic acid-rich sides and the hydrophobic styrene-rich sides.

Figure 2F:
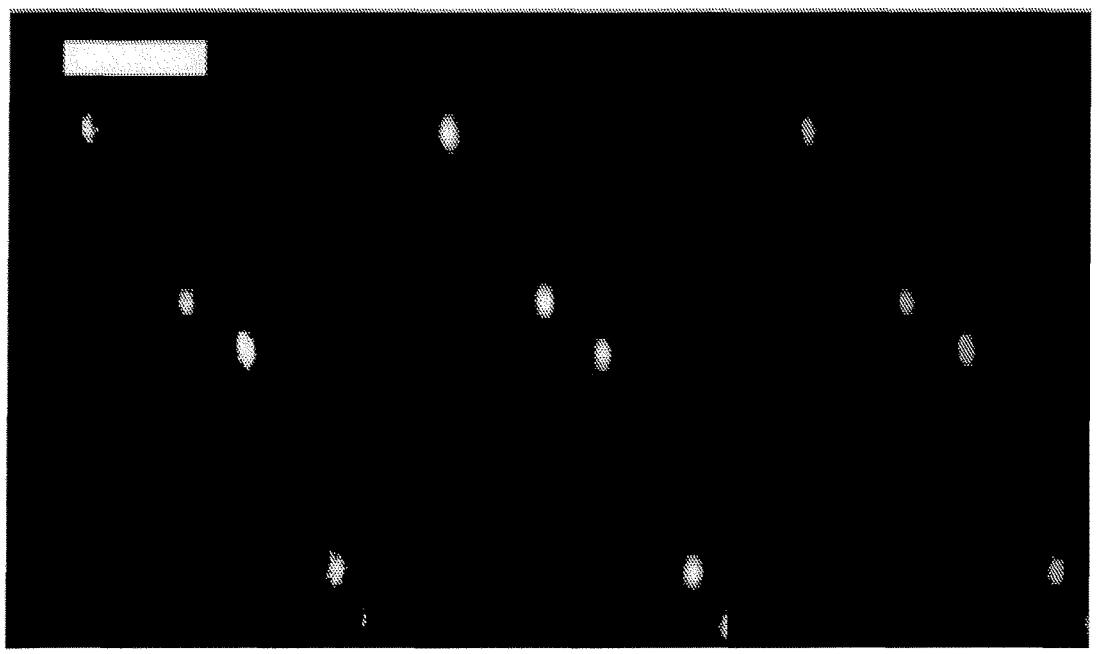
FIG. 2f is a microscope image of (Sty/AA) Janus particles after hydrolysis in accordance with aspects of the present invention.
Figure 2G:
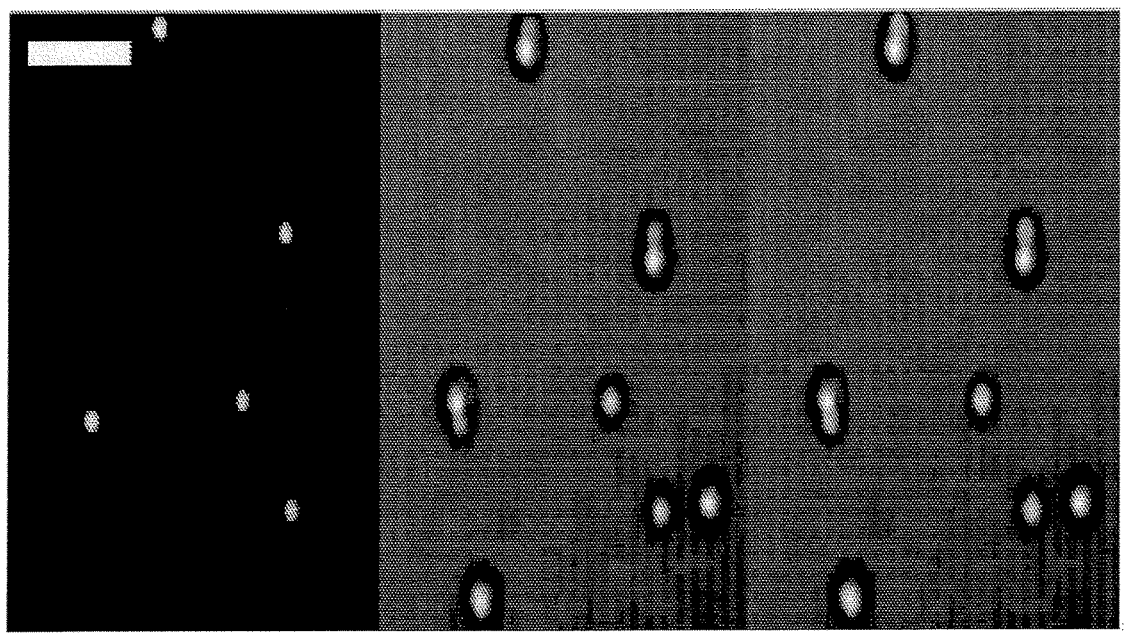
FIG. 2g is a microscope image of (Sty/PMAA) Janus particles after hydrolysis in accordance with aspects of the present invention.

A comparison of FIG. 2f and FIG. 2g depicts the improvement in phase separation when using a polymer having a higher glass transition temperature (such as PtBMA) versus a polymer with a lower glass transition temperature (such as PtBA). FIG. 2f depicts (Sty50/AA50) Janus particles produced via seeded emulsion polymerization using a monomer mixture containing tBA monomers. FIG. 2g depicts (Sty50/PMAA50) Janus particles produced using a monomer mixture that substitutes tBMA monomers for tBA monomers. Toluene containing hydrophobic fluorescent dye Nile Red was placed in the particle dispersions for both sets of Janus particles. The hydrophobic toluene carrying the Nile Red diffused into the particles and accumulates at areas of hydrophobicity, primarily the styrene-rich side (PS domain). The dyed particles were imaged under a fluorescent microscope, and both sets of particles displayed a strong fluorescence on the styrene-rich hydrophobic side. However, the (Sty50/AA50) Janus particles in FIG. 2f also displayed a weak fluorescence on the acrylic acid-rich side, indicating the presence of some amount of styrene. No fluorescence was shown on the methacrylic acid-rich side of the (Sty50/PMAA50) Janus particles of FIG. 2g. This demonstrates the improved phase separation of the (Sty50/PMAA50) Janus particles in comparison to the (Sty50/AA50) Janus particles.

Figure 2H:
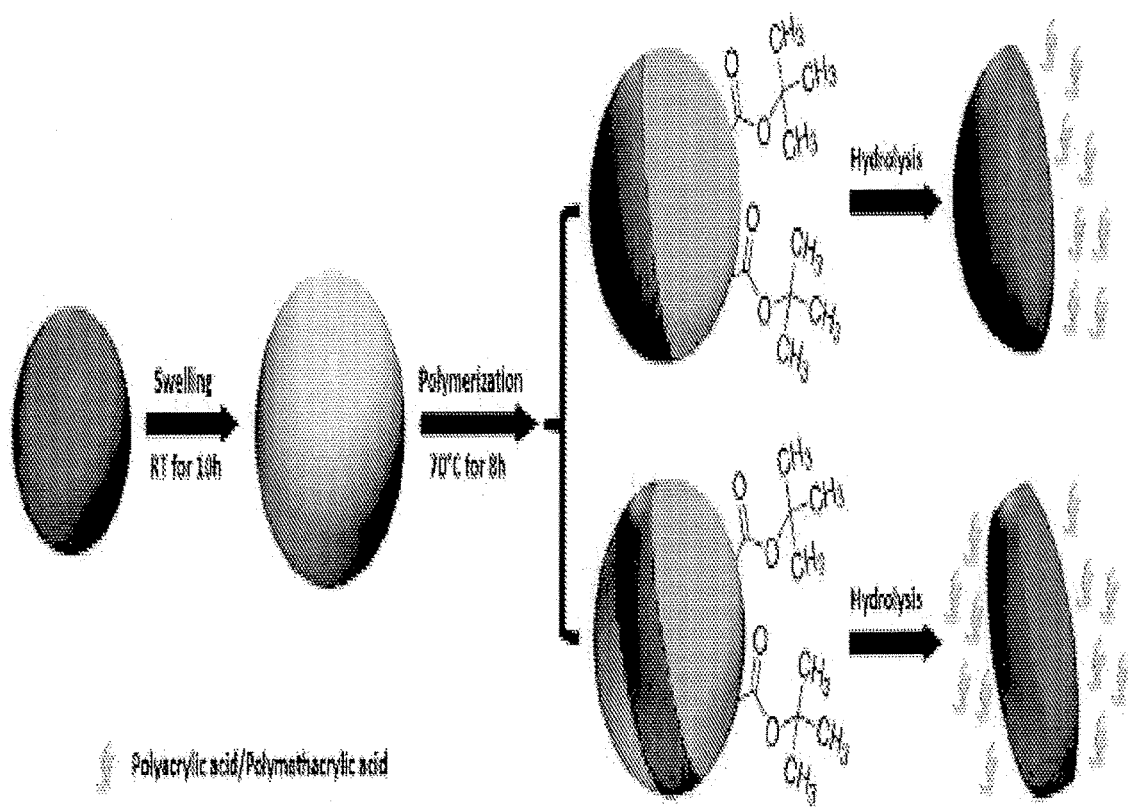
FIG. 2h is a schematic illustration of a method for producing anisotropic particles in accordance with aspects of the present invention.

Turning to FIG. 2h, a schematic illustration for the synthesis of anisotropic particles in large quantities using seeded emulsion polymerization followed by acid hydrolysis is shown.

Monodisperse seed particles composed of linear polystyrene were synthesized by dispersion polymerization. 0.03 gram polyvinylpyrrolidone (Mw~55,000) is dissolved in 75 ml isopropyl alcohol (99.9%) in a 100 ml flask. Then 9 ml deionized water containing 0.02 gram ammonium persulfate (98%) as initiator was added to the flask followed by the addition of 6.6 ml styrene (≥99%). After the flask was sealed with a rubber stopper and Teflon® tape, the mixture was thoroughly mixed by shaking the flask for 60 seconds. Subsequently the mixture was purged with nitrogen for 5 minutes. The flask was mounted onto a tumbler (IKA® RW16 basic) and immersed in an oil bath at 70° C. The flask was tumbled at 100 revolutions per minute (rpm) for 24 hours for polymerization. The polymerized linear polystyrene particles are shown in FIG. 2b.

After polymerization, the particles were washed four times with deionized water using centrifugation. 20 wt % linear polystyrene dispersion was prepared by dispersing linear polystyrene particles in 1 wt % poly vinyl alcohol (PVA, Mw 13,000-23,000, 87-89% hydrolyzed) aqueous solution. A 20 wt % monomer emulsion was prepared by vortexing a mixture consisting of toluene, tert-butyl acrylate (98%), and 0.5 wt % initiator 2,2'-Azobis(2.4-dimethyl valeronitrile) (V-65B) (Wako) with a 1 wt % PVA aqueous solution. To overcome the problem of presence of some amount of styrene and acrylic acid in the acrylic acid-rich side and the styrene-rich side, respectively, styrene was replaced with toluene in the monomer emulsion. Toluene is non-polymerizable and can be removed by evaporation after the polymerization of tBA. A cross-linker such as DVB was not used in the monomer mixture. It is believe that this reduces incomplete phase separation, because a cross-linked polymer network may reduce the mobility of polymer chains. Linear polystyrene particles were swollen with the monomer mixture by mixing the LPS dispersion and the monomer emulsion to obtain monomer-swollen linear polystyrene particles.

The volume ratio of the linear polystyrene and the monomer mixture was 20:80. The particle-monomer mixture was mounted on a rotator (Glas-Col®) and rotated for 8 hours at 60 rpm. Seeded emulsion polymerization was performed by tumbling the particle-monomer mixture in an oil bath at 70° C. at 100 rpm for 10 hours. After seed emulsion polymerization, particles were washed with deionized water at least six times by centrifugation to remove poly vinyl alcohol and unreacted monomer.

The particles from seeded emulsion polymerization were then stirred in an acid mixture consisting of 80 vol % trifluoroacetic acid (99%) and 20 vol % formic acid (≥95%) at 1200 rpm for 24 hours for the hydrolysis of tert-butyl acrylate. The volume ratio of particles and acid mixture is 1:40. The hydrolyzed particles were washed with deionized water 10 times by centrifugation. The hydrolysis results in styrene-rich anisotropic particles (polystyrene or PS domes). It is believe that without a cross-linker like DVB, only linear PtBA is synthesized during the seeded emulsion polymerization, and the linear PtBA is converted to linear PAA after hydrolysis. Linear PAA is highly soluble in water and is washed away when the particles are washed with deionized water. The process may also be carried out using tert-butyl methacrylate monomers in place of tert-butyl acrylate monomers in the monomer mixture, which may result in the linear PMAA being washed away during the washing step.

Figure 2I:
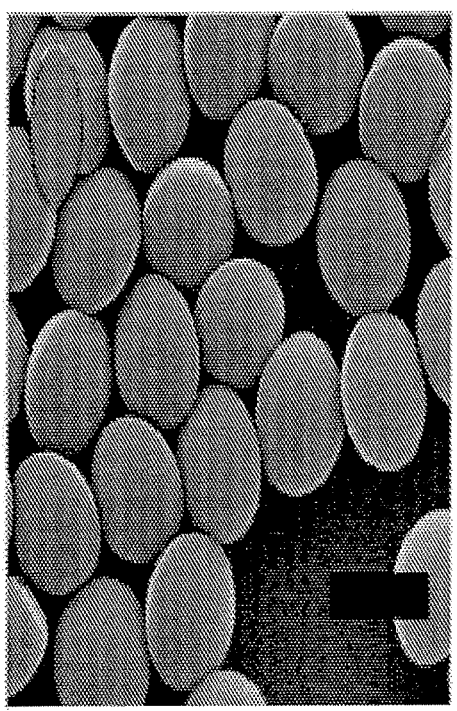
FIG. 2i is a microscope image of anisotropic particles in accordance with aspects of the present invention.
Figure 2J:
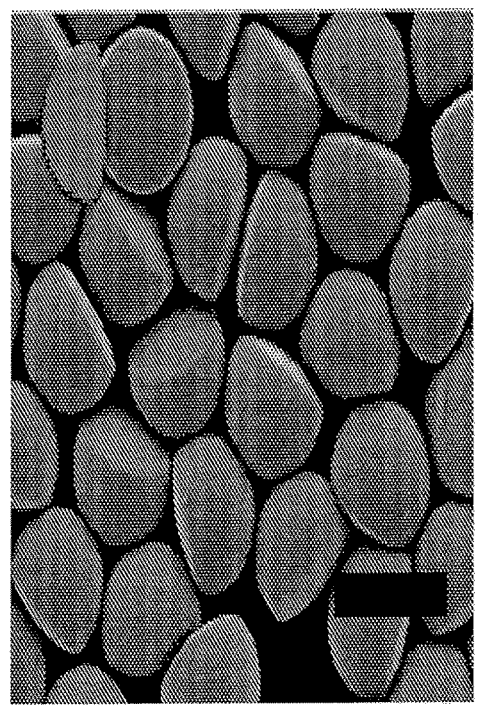
FIG. 2j is a microscope image of anisotropic particles in accordance with aspects of the present invention.

FIGS. 2i and 2j depict anisotropic particles synthesized using different volume ratios of linear polystyrene (LPS), tBA, and toluene. No DVB was used in either monomer mixture. FIG. 2i shows anisotropic particles synthesized using 1:2:27 LPS to tBA to toluene. FIG. 2j shows anisotropic particles synthesized using 1:1:18 LPS to tBA to toluene. Both photos depict anisotropic particles after the washing step with deionized water, wherein the linear PAA is washed away after hydrolysis.

Figure 3A:
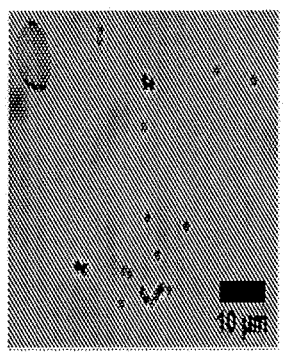
FIG. 3a is a microscope image of (Sty/AA) Janus particles made with a 50% vol/vol monomer mixture of styrene and tBA dispersed in a pH=2.2 aqueous solution in accordance with aspects of the present invention.
Figure 3B:
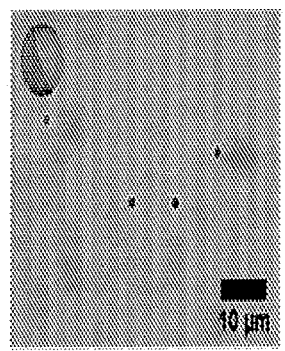
FIG. 3b is a microscope image of (Sty/AA) Janus particles made with a 50% vol/vol monomer mixture of styrene and tBA dispersed in DI water in accordance with aspects of the present invention.
Figure 3C:
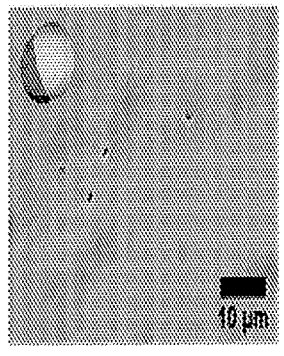
FIG. 3c is a microscope image of (Sty/AA) Janus particles made with a 50% vol/vol monomer mixture of styrene and tBA dispersed in a pH=11.0 aqueous solution in accordance with aspects of the present invention.

Polymer networks containing high mole fractions of acrylic acid (AA) units are known to have pH-responsiveness; that is, they swell and deswell in high and low pH conditions, respectively. Such a stimuli-responsive property of AA-rich network makes the inventive Janus particles change their shape and behavior drastically in response to changes in solution pH. As shown in FIG. 3a, at pH=2.2, Janus particles made from a monomer mixture of 50 vol % of both styrene and tert-butyl acrylate (Sty50/AA50) remain oblate-like and form clusters in the suspension. The formation of these clusters indicates that these particles interact attractively, which is reminiscent of the aggregation of amphiphilic molecules in water (e.g., micelle formation). The aggregation of the particles is likely due to the protonation of acrylic acid groups and the loss of surface charge, leading to the reduction of electrostatic repulsive interactions between particles. As depicted in FIG. 3b, when these (Sty50/AA50) Janus particles are dispersed in deionized water (pH=5.5-6.0), however, these particles become individually dispersed and, at the same time, become more or less spherical in shape. Such a shape change likely stems from slight hydration of the AA-rich side and partial ionization of carboxylic acid groups, which keep the particles apart via electrostatic repulsion. When the basicity of the suspension is further increased to pH 11.0, these Janus particles transform their shape from spheres to dumbbells (also known as snowmen, dimers and dicolloids), as shown in FIG. 3c. The AA-rich lobes of these Janus dumbbells become almost transparent due to significant swelling in the high pH environment.

Figure 3D:
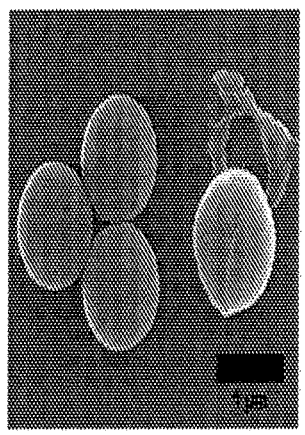
FIG. 3d is a microscope image of (Sty/AA) Janus particles made with a 75:25 vol/vol monomer mixture of styrene and tBA (Sty75/AA25) in accordance with aspects of the present invention.
Figure 3E:
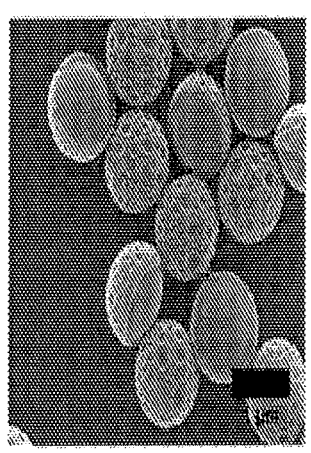
FIG. 3e is a microscope image of (Sty/AA) Janus particles made with a 25:75 vol/vol monomer mixture of styrene and WA (Sty25/AA75) in accordance with aspects of the present invention.
Figure 3F:
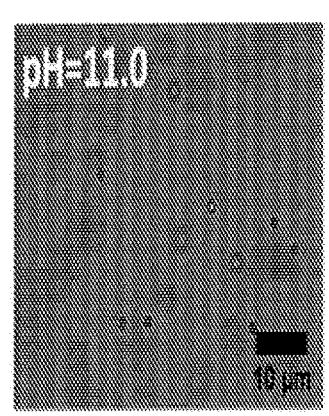
FIG. 3f is a microscope image of (Sty/AA) Janus particles made with a 75:25 vol/vol monomer mixture of styrene and tBA (Sty75/AA25) dispersed in pH=11.0 in accordance with aspects of the present invention.
Figure 3G:
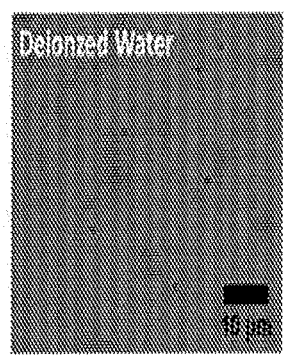
FIG. 3g is a microscope image of (Sty/AA) Janus particles made with a 25:75 vol/vol monomer mixture of styrene and tBA (Sty25/AA75) dispersed in pH=5.5-6 in accordance with aspects of the present invention.

The pH-sensitivity, and thus the shape-changing properties of these Janus particles can be tuned by controlling the composition of the monomer mixture that is used for seeded emulsion polymerization. To demonstrate such tunability, we synthesize two additional composite particles using monomer mixtures with the styrene:tert-butyl acrylate ratios of 75:25 and 25:75. The pH-sensitivity of these two amphiphilic Janus particles in different pH solutions are quite different. As shown in FIG. 3d, (Sty75/AA25) Janus particles remain spherical at pH=11.0 (FIG. 3f), whereas (Sty25/AA75) Janus particles (FIG. 3e) transform to dumbbell shapes in deionized water (pH=5.5-6) (FIG. 3g). The changes in the responsiveness (i.e., swellability) of the AA-rich sides likely stems from the changes in their composition. In short, our results demonstrate that the aggregation/dispersion behavior and shape of (Sty/AA) Janus particles are highly sensitive to the solution pH and that their pH sensitivity can be tailored by tuning the ratio of styrene and tert-butyl acrylate used for the synthesis of these particles.

One way to characterize the shape changes that are observed in these particles as a function of the solution pH is to use the concept of packing parameter, which is typically used to characterize the shape of molecular surfactants and the size ratio of hydrophilic and hydrophobic segments within a molecular surfactant. For example, while the (Sty50/AA50) Janus particles have a packing parameter that is larger than 1.0 in acidic solutions, the packing parameter of the same particle decreases below 1.0 in basic solutions. Such a drastic shape change may lead to a reversal in the amphiphilicity of these particles; that is, in the language of hydrophile-lypophile balance (HLB), (Sty/AA) Janus particles have lypophile-dominant property in acidic solutions, whereas they completely switch to become hydrophile-dominant solid amphiphile in basic solutions. The implications of such an amphiphilicity-reversing property of (Sty/AA) Janus particles are described in Example 3 below.

Example 2—Emulsification, Phase Inversion, and Emulsion Characterization 3 ml toluene (99.8%) containing 0.01 wt % Nile Red (technical grade) and 3 ml of an aqueous suspension containing 0.5 wt % (Sty50/AA50) Janus particles are added in a glass vial and homogenized at 9500 rpm for 60 seconds using a homogenizer (Ultra-Turrax® T25 basic). The pH of the aqueous phase is adjusted using 1.0 M NaOH or 1.0 N HCl solutions. For phase inversion, 20 µL of 1.0 N HCl and 1.0 M NaOH are added in oil-in-water (O/W) emulsion (6.0 mL) generated with (Sty50/AA50) Janus particles in pH 11.0 and water-in-oil (W/O) emulsion (6.0 mL) generated with (Sty50/AA50) Janus particles in deionized water, respectively. The emulsions are thoroughly mixed using a vortex mixer for 30 seconds and subsequently homogenized at 9500 rpm for 60 seconds. To image emulsion droplets using fluorescence microscopy, a drop of emulsions is placed in between two glass slides. To image (W/O) emulsions, glass slides are silanized using 1 vol % octadecyltrichlorosilane (OTS, ≥90%) in toluene for 30 seconds followed by heat treatment on a hot plate at 150° C. for 30 minutes. To image (Sty50/AA50) Janus particles on emulsion surfaces, toluene is replaced with styrene and 1 wt % V-65B is added to enable polymerization of the oil phase. Polymerized emulsion samples are washed thoroughly with deionized water before imaging.

To characterize the interactions between emulsion droplets, toluene-in-water emulsions are prepared by first homogenizing a mixture of 1 ml toluene and 4 ml 0.5 wt % (Sty50/AA50) Janus particles dispersed in aqueous solution of either pH 2.2 or pH 11.0 at 9500 rpm for 60 seconds followed by vortexing for 30 seconds. The emulsions are transferred into a glass syringe and injected into a glass microchannel with a 1×1 mm2 square cross-section. The flow pattern of the toluene-in-water emulsions is recorded by a high speed camera (Phantom v7.1).

Figure 4A:
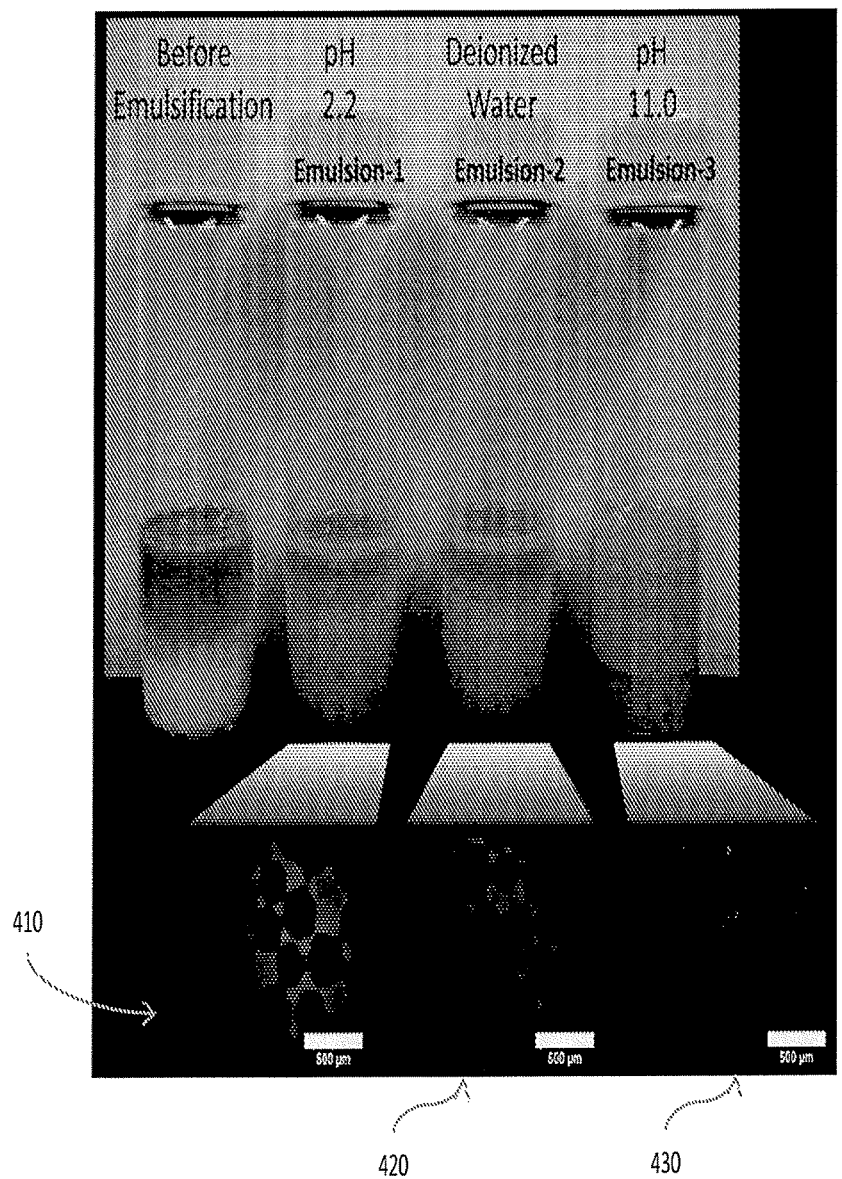
FIG. 4a is macroscopic and fluorescence microscopy images of emulsions made with aqueous phases of varying pH in accordance with aspects of the present invention.
Figure 4B:
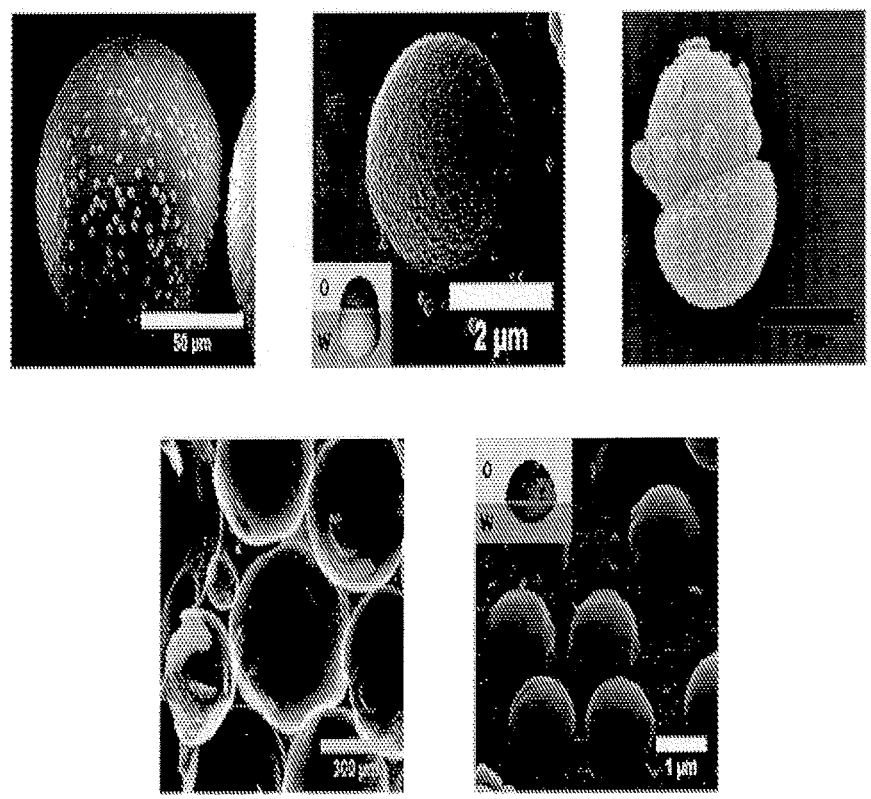
FIG. 4b is a microscope image of (Sty/AA) Janus particles dispersed in an emulsion and attached to the emulsion interface in an upright position.

Example 3—Controlling the Type of Pickering Emulsion Stabilized by (Sty/AA) Janus Particles Emulsions were generated while keeping the volume ratio of oil and aqueous phases constant at 50:50. By keeping the volumes of the two phases equal to each other, the system may generate the type of emulsion that the Janus particles prefer and avoid the influences of dominant fluid phase in determining the final emulsion type. An oil-soluble dye, Nile Red, is added to facilitate emulsion characterization, and Janus particles are dispersed in the aqueous phase. As shown in FIG. 4a, emulsions made with particles in pH 2.2 water and in deionized water sediment to the bottom of the vials with excess oil phase remaining on top of the settled emulsions. In contrast, the emulsion made at pH 11.0 creams with an aqueous phase forming at the bottom. Given that the density of toluene is smaller than that of water, these observations suggest that emulsions made with pH 2.2 and DI water are water-in-oil (W/O) emulsions, whereas the emulsion made at pH 11.0 is an oil-in-water (O/W) type. This prediction is further confirmed by the fluorescence microscopy images 410, 420, and 430 of the emulsions. Fluorescence microscopy images 410, 420, and 430 indicate that emulsion droplets made at pH 2.2 and DI water are composed of the aqueous phase (dark dispersed phase), whereas those made at pH 11.0 are oil droplets (bright dispersed phase). The size of W/O emulsion droplets is significantly larger than that of O/W emulsions likely because of the high charge of (Sty50/AA50) Janus particles at pH 11.0, leading to strong repulsive interparticle interactions. (Sty50/AA50) Janus particles attached to the W/O or O/W interfaces in these two types of emulsions can be observed by using styrene as the oil phase and polymerizing it. As shown in FIG. 4b, Janus particles are seen to attach in the so-called upright orientation in both cases; that is, each side of these Janus particles fully resides in its preferred fluid phase, and the boundary between the two sides resides at the W/O or O/W interface.

The inventive (Sty/AA) Janus particles can change their preferred emulsion type in response to pH changes in the aqueous phase and stabilize different types of emulsion. The preferred emulsion type as a function of the solution pH may be attributed to the changes in the shape leading to the reversal of the amphiphilicity of (Sty/AA) Janus particles, which is analogous to the effect of the packing parameter and the HLB of molecular surfactants, respectively, on the type of emulsions that they are able to stabilize. The upright orientation of these Janus particles at the water-oil interface may play an important role in maximizing the effect of particle shape change on the emulsion type that can be stabilized with these particles.

The W/O emulsion made with the inventive (Sty/AA) Janus particles in deionized water is notable in that it does not conform to the so-called Bancroft or Finkle rules, which state that the continuous phase of an emulsion is the one in which the emulsifier is preferentially solubilized (Bancroft) or dispersed (Finkle). Using the pH-responsiveness and amphiphilicity-reversing properties of the (Sty/AA) Janus particles, it is possible to generate emulsions that both follow (pH 11.0) and violate (deionized water) these empirical rules.

Figure 5:
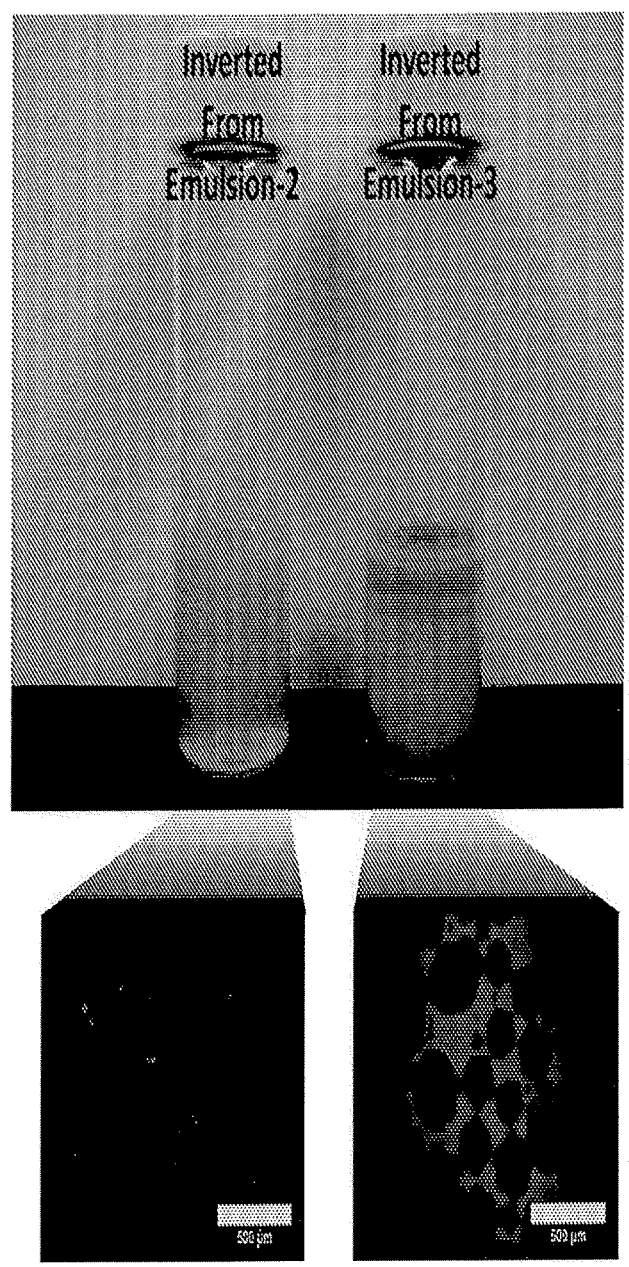
FIG. 5 is macroscopic and fluorescence microscopy images of emulsions inverted from the emulsions depicted in FIG. 5 in accordance with aspects of the present invention.

The fact that the type of emulsions generated with (Sty/AA) Janus particles depends on the pH of the aqueous phase suggests that one type of emulsion generated under one condition can be inverted into the other type simply by changing the solution pH. Phase inversion emulsification triggered by an external stimulus (also known as transitional phase inversion emulsification) is an important process by which emulsions with highly viscous dispersed phases can be generated and requires changes in the HLB as well as the shape of stimuli-responsive surfactants or the wettability of homogenous particles that stabilize the original emulsions. The transitional phase inversion of emulsions stabilized with (Sty50/AA50) Janus particles may be accomplished by adding a small amount of highly concentrated basic and acid solution (~20 µL of 1.0 M NaOH and 1.0 N HCl, respectively) into 6 ml of W/O and O/W emulsions originally generated with DI water and pH 11.0 (Emulsion-2 and Emulsion-3 in FIG. 4a), respectively. Upon vigorous mixing, the Emulsions-2 and -3 become O/W and W/O emulsions, respectively as shown in FIG. 5; that is, the types of final emulsions are opposite of the starting emulsions in both cases. By changing the shape of the AA-rich side and relative size of styrene- and AA-rich sides, the amphiphilicity of these particles reverses in response to changes in solution pH, which eventually leads to the phase inversion of the emulsions. The transitional phase inversion of Pickering emulsions stabilized with Janus particles is, thus, facilitated by the dynamic tunability of the shape as well as the amphiphilicity of the pH-responsive (Sty/AA) Janus particles.

Example 4—Controlling Interactions Between Pickering Emulsion Droplets

The pH-dependent aggregation/dispersion behavior of (Sty50/AA50) Janus particles in the bulk aqueous phase, as seen in FIG. 2a, suggests that the interactions of Pickering droplets stabilized with these particles could also depend on the pH of the solution. To test this hypothesis, oil-in-water (O/W) emulsions at pH 2.2 or pH 11.0 were generated and analyzed for interactions between Pickering emulsion droplets. Unlike Example 3 above where the oil:water ratio was kept 50:50, by decreasing the volume fraction of oil significantly (oil:water=20:80), O/W emulsions can be generated regardless of the pH of the aqueous phase.

The difference in the interactions between emulsions under acidic and basic conditions can be indirectly observed by the morphology of emulsions. The O/W emulsion generated at pH 2.2 shows droplets that are aggregated to form clusters as shown in FIG. 6a. In contrast, when the pH of the emulsion is switched to pH 11.0, the droplets become well-separated as shown in FIG. 6b, indicating repulsive interactions.

Figure 7A:
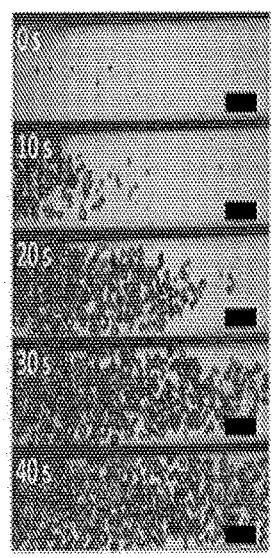
FIG. 7a is a microscope image of toluene-in-water emulsions made with (Sty50/AA50) Janus particles made at pH 2.2 flowing inside a glass capillary microchannel in accordance with aspects of the present invention.
Figure 7B:
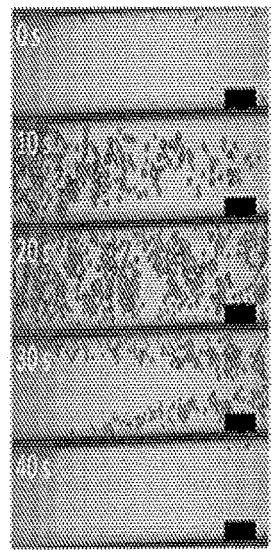
FIG. 7b is a microscope image of toluene-in-water emulsions made with (Sty50/AA50) Janus particles made at pH 11.0 flowing inside a glass capillary microchannel in accordance with aspects of the present invention.
Figure 7C:
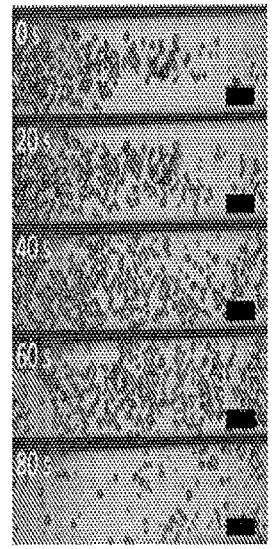
FIG. 7c is a microscope image of toluene-in-water emulsions made with (Sty50/AA50) Janus particles made at pH 2.2 being washed by a pH 11.0 aqueous solution in accordance with aspects of the present invention.

The tunable interactions between Pickering emulsion droplets stabilized with (Sty50/AA50) Janus particles can be more clearly demonstrated by observing the flow behavior of these emulsions under different pH conditions. When an emulsion prepared at pH 2.2 flow across a microchannel made of glass (1×1 mm2 square cross-section), droplets stick to the glass surface and to each other as they flow in the channel as shown in FIG. 7a. Droplets also move in clusters rather than as individual droplets (see Movie 1 in Supporting Information), strongly indicating that these emulsion droplets interact attractively and are very adhesive. Emulsion droplets prepared at pH 11.0, however, do not stick to the channel wall and flow freely in the channel as single droplets as shown in FIG. 7b, indicating that these emulsion droplets are repulsive. When an emulsion is introduced in the channel at pH 2.2 initially and then the pH of the continuous phase is changed to pH 11.0, the emulsion droplets that are originally stuck to the glass channel surface and to each other suddenly become individually dispersed and flow freely down the channel as shown in FIG. 7c. Again these results demonstrate that the interactions between emulsion droplets can be readily tuned by changing the solution condition without destabilizing the emulsion.

Figure 8:
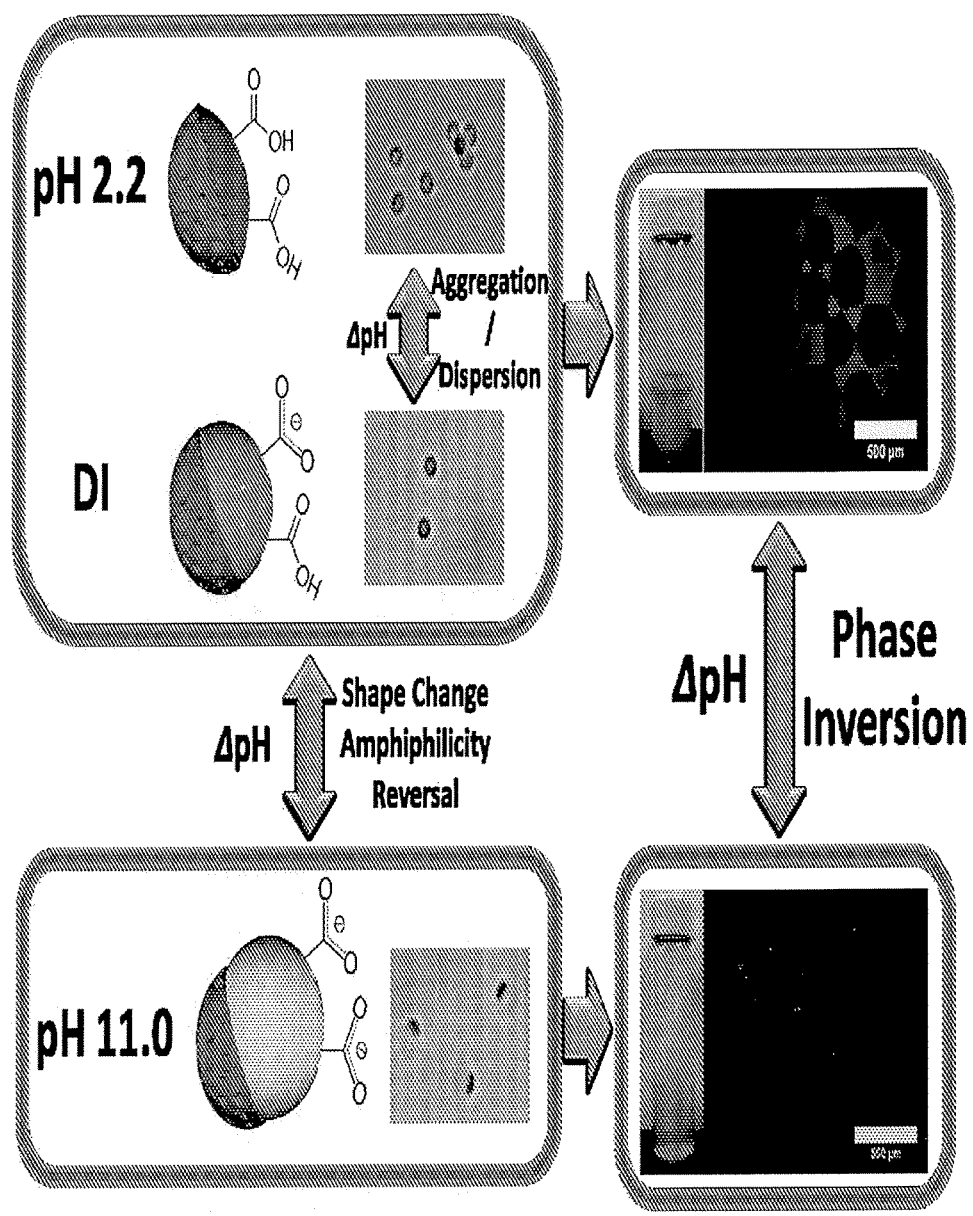
FIG. 8 is a schematic illustration of the change in behavior of the amphiphilic particles as a function of pH in accordance with aspects of the present invention.

Turning next to FIG. 8, the pH-responsiveness of the inventive Janus particles according to one exemplary embodiment is illustrated. At an aqueous phase pH=2.2, the Janus particles display an oblate-like shape and form in clusters in the suspension. When these particles are dispersed in deionized water, the particles become individually dispersed and generally spherically shaped. A phase inversion occurs at an aqueous phase pH=11.0. At this pH, the Janus particles transform their shape from spherical to a "dumbbell" shape and undergo an amphiphilicity reversal.

Example 5—Stabilizing Water-in-Oil-in-Water Emulsions

Figure 9:
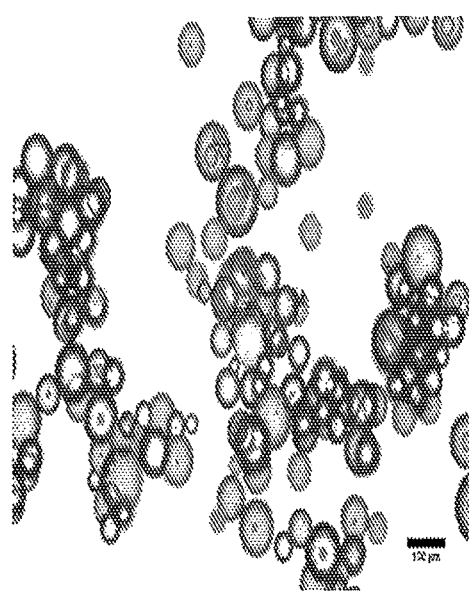
FIG. 9 is a microscope image of a water-in-oil-in-water multiple emulsion generated by homogenizing 0.5 wt % (Sty50/AA50) Janus particles dispersed in a pH 2.2 aqueous solution in accordance with aspects of the present invention.

By controlling the ratio of water and oil, it is possible to control the morphology/type of emulsions that are stabilized at pH 2.2. Water-in-oil-in-water (W/O/W) multiple emulsions, for example, can be generated by homogenizing 0.5 wt % (Sty50/AA50) Janus particles dispersed in pH 2.2 aqueous solution with toluene as shown in FIG. 9. The volume ratio of toluene and aqueous phase is 20:80.

Example 6—Inducing Phase Inversions

The volume fraction of oil (toluene) phase ($\Phi_o$) in an oil (toluene)/aqueous mixture may have a significant effect on the type of emulsion generated using Janus particles. A transitional phase inversion may be induced by altering the pH of the aqueous phase of the mixture. A catastrophic phase inversion may be induced by altering the volume fraction of oil phase ($\Phi_o$), which may result in W/O/W multiple emulsions generated in one emulsification step. Though W/O/W multiple emulsions are known to be generated during catastrophic phase inversion, they are typically extremely unstable. However, W/O/W multiple emulsions stabilized by Janus particles disclosed herein are highly stable.

Figure 10A:
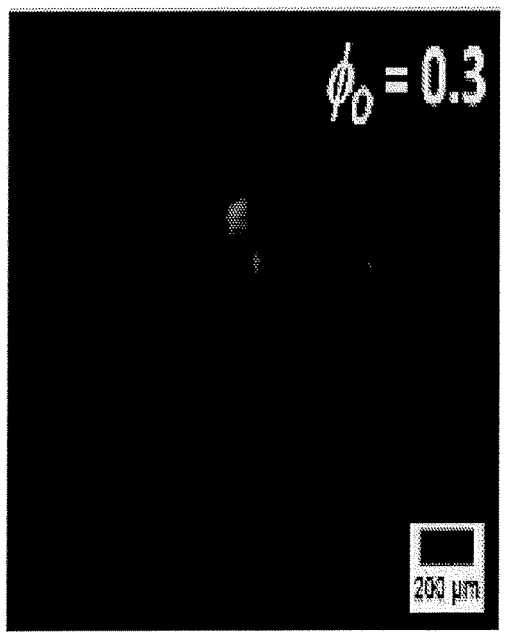
FIG. 10a is a fluorescent microscope image of a water-in-oil-in-water multiple emulsion at pH 5.0 and with a volume fraction of oil phase ($\Phi_o$) of 0.3 in accordance with aspects of the present invention.
Figure 10B:
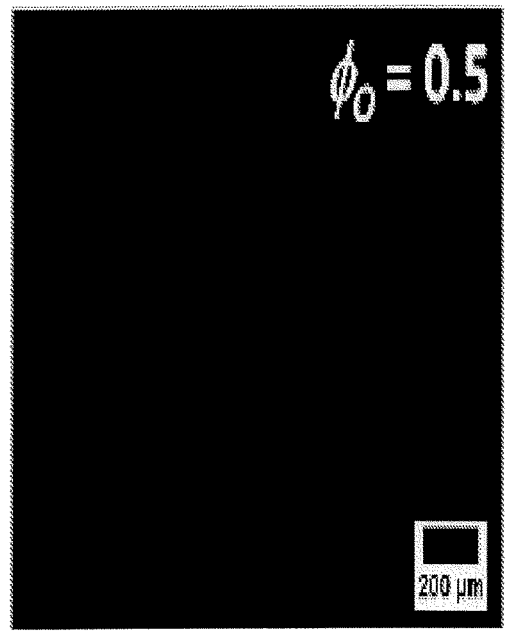
FIG. 10b is a fluorescent microscope image of a water-in-oil emulsion at pH 5.0 and with a volume fraction of oil phase ($\Phi_o$) of 0.5 in accordance with aspects of the present invention.

FIGS. 10a and 10b depict fluorescent microscopy images of emulsions stabilized by 0.5 wt % (Sty50/AA50) Janus particles at pH 5.0. The volume fraction of oil phase ($\Phi_o$) in FIG. 10a is 0.3, which results in a W/O/W multiple emulsion. The fluorescing oil droplets encapsulate several dark regions, which are aqueous pockets within the oil droplets. The oil droplets are further surrounded by dark regions of aqueous continuous phase. The (Sty50/AA50) Janus particles stabilize the W/O/W multiple emulsion at this pH and volume fraction of oil phase ($\Phi_o$). The emulsion in FIG. 10b has a volume fraction of oil phase ($\Phi_o$) of 0.5, which results in a W/O emulsion as characterized by the dark droplets within fluorescing oil regions.

Figure 10C:
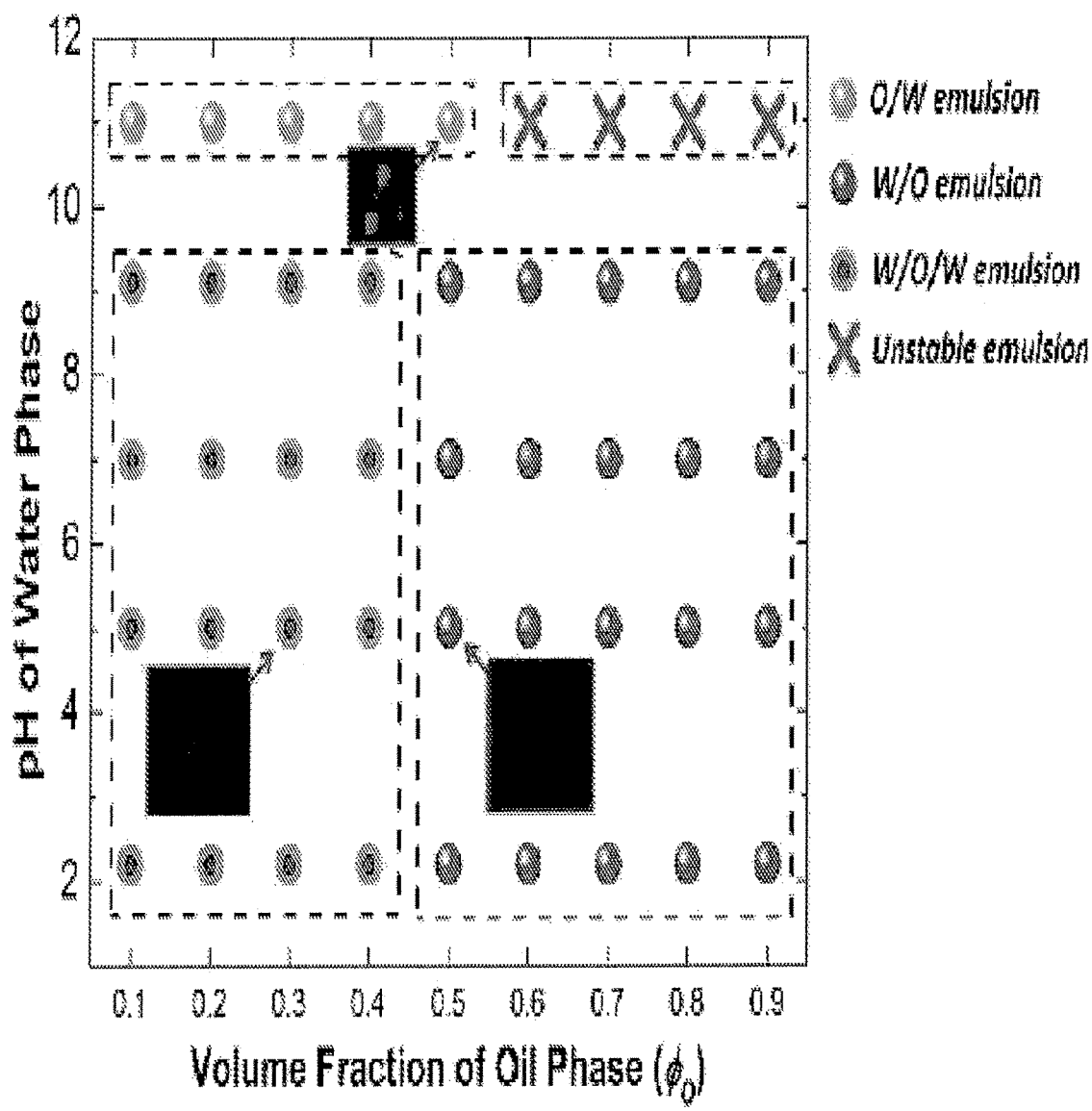
FIG. 10c is a schematic diagram of catastrophic phase inversion and types of emulsions present at different pH levels and volume fractions of oil phase ($\Phi_o$) in accordance with aspects of the present invention.

FIG. 10c depicts a phase diagram divided into four regions which depict the types of emulsions present at different pH levels and volume fractions of oil phase OM. When the pH of the aqueous phase is 11 and the ($\Phi_o$)≤0.5, simple oil-in-water (O/W) emulsions are formed. Without intending to be limited to a particular theory, it is believed that this results because the hydrophilic acrylic acid-rich sides of the Janus particles have been ionized and are larger than the hydrophobic styrene-rich side. However, when ($\Phi_o$)≥0.5 and pH is 11, stable emulsions cannot be generated and these mixtures separate into oil and water phases after homogenization. When the ($\Phi_o$)≥0.5 and the pH of the aqueous phase is less than 11, water-in-oil (W/O) emulsions form because the acrylic acid-rich sides of the Janus particles are protonated, causing the particles to be dominated by the hydrophobic styrene-rich sides. A W/O emulsion can be inverted via catastrophic phase inversion to a W/O/W emulsion merely by decreasing the volume fraction of the oil phase ($\Phi_o$) to below 0.5 in a single step. An O/W emulsion may also be inverted via transitional phase inversion to a W/O/W emulsion by decreasing the pH of the aqueous phase to below 11. Other processes may involve both the alteration of pH and volume fractions of certain phases to generate W/O/W multiple emulsions.

Figure 11A:
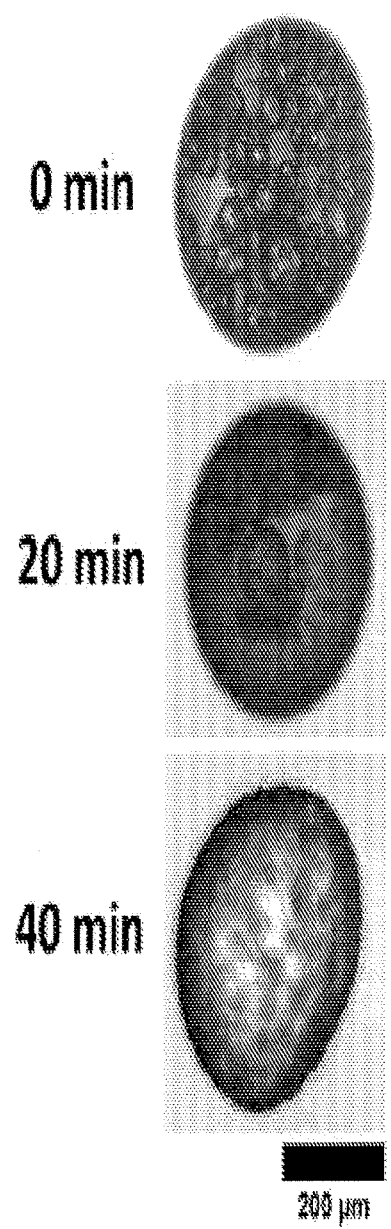
FIG. 11a is a microscope image of a water-in-oil-in-water emulsion stabilized with (Sty50/AA50) Janus particles as pH is increased over time in accordance with aspects of the present invention.

Example 7—Triggering Release of Encapsulated Water Droplets from Water-in-Oil-in-Water Emulsions W/O/W multiple emulsions stabilized using Janus particles may release encapsulated water droplets upon increasing the pH of the continuous aqueous phase. Thus, these double emulsions can be used as delivery vehicles to enable triggered release of active agents such as nutrients, drugs, pesticides, fragrances and foodstuff. FIG. 11a depicts a progression of a W/O/W multiple emulsion stabilized with (Sty50/AA50) Janus particles releasing encapsulated water droplets over time (a span of 40 minutes) as pH is increased. Without limitation to a particular theory, it is believed that when the pH of the continuous phase is raised, hydroxide (OH—) ions are able to transport through the oil phase of the W/O/W emulsion and induce destabilization of the inner aqueous droplets. It is also believed that an increase in the pH changes the shape of the Janus particles in such a way that the hydrophilic acrylic acid-rich sides of the Janus particles have been ionized and are larger than the hydrophobic styrene-rich side. The release of the water droplets over the 40 minutes is facilitated using a gentle tumble agitation while continuously increasing the pH of the emulsion.

Figure 11B:
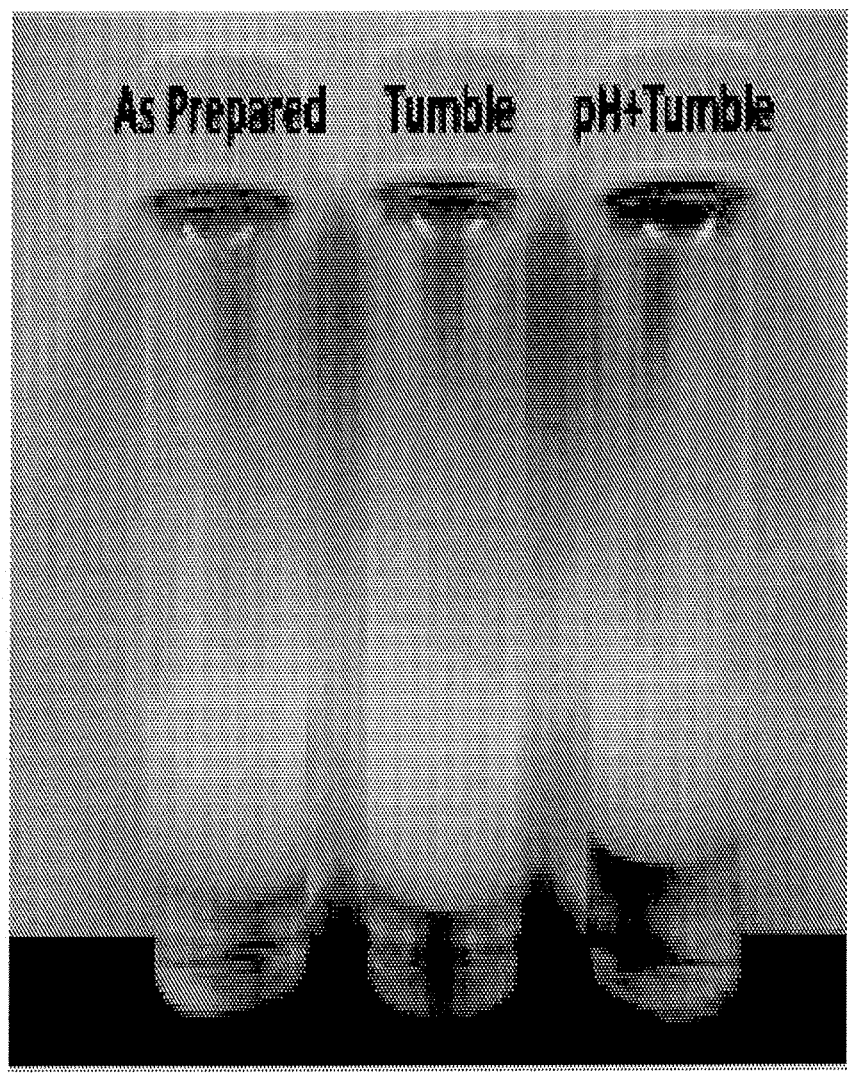
FIG. 11b is a macroscopic image of a water-in-oil-in-water emulsion stabilized with (Sty50/AA50) Janus particles as prepared, under tumble agitation conditions, and under tumble agitation conditions combined with increase in pH in accordance with aspects of the present invention.

Agitation alone may not achieve an efficient triggered released of encapsulated water droplets from a W/O/W emulsion. It is believed that an increase in pH may be needed to achieve a more complete triggered release. FIG. 11b demonstrates that the boundary between emulsion phase and aqueous phase may not change for multiple emulsions (W/O/W emulsions) before and after agitation when no changes in pH are induced. However, upon increasing the pH in conjunction with agitation, the boundary between aqueous phase and emulsion phase indicates a release of encapsulated water as demonstrated by the increased volume of the aqueous phase. It is therefore believed that increasing the pH is helpful in achieving the release of encapsulated water droplets from multiple emulsions stabilized using the Janus particles disclosed herein.

Figures 11C, 11D, 11E:
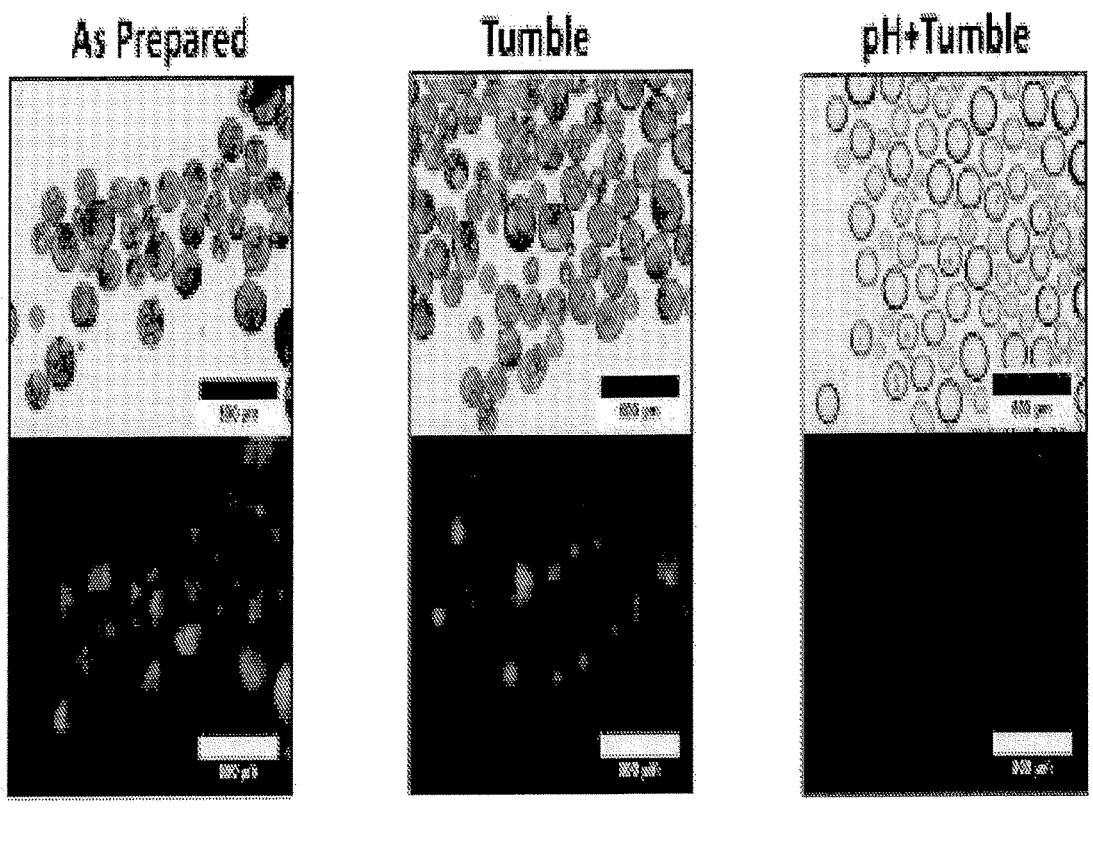
FIG. 11c is a general microscope image and fluorescence microscopy image of a water-in-oil-in-water emulsion as prepared and stabilized with (Sty50/AA50) Janus particles in accordance with aspects of the present invention.
FIG. 11d is a general microscope image and fluorescence microscopy image of a water-in-oil-in-water emulsion stabilized with (Sty50/AA50) Janus particles and subjected to tumble agitation in accordance with aspects of the present invention.
FIG. 11e is a general microscope image and fluorescence microscopy image of a water-in-oil-in-water emulsion stabilized with (Sty50/AA50) Janus particles and subjected to tumble agitation in conjunction with an increase in pH, in accordance with aspects of the present invention.

A comparison of FIGS. 11c, 11d, and 11e, depicting emulsions stabilized using Janus particles described herein under general and fluorescence microscopy, also illustrates the importance of pH increase in stimulating triggered release. FIG. 11c depicts a W/O/W emulsion as prepared and stabilized by Janus particles. FIG. 11d depicts the same emulsion after tumble agitation. A comparison of FIGS. 11c and 11d microscopy images indicate that many of the water droplets encapsulated within the oil phase remain after the tumble agitation. However, FIG. 11e depicts the same emulsion after an increase of pH in conjunction with tumble agitation. Most of the inner droplets after pH increase have disappeared from within the oil phase. While pH increase is important to triggered release of encapsulated aqueous phase from W/O/W emulsions stabilized with Janus particles described herein, it is believed that mild agitation facilitates and accelerates the process of release.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A biphasic amphiphilic particle adapted to stabilize a first multiphasic mixture comprising a first aqueous phase having a first pH and a second multiphasic mixture comprising a second aqueous phase having a second pH.

2. The biphasic amphiphilic particle of claim 1, adapted to cause a phase inversion of the first multiphasic mixture into the second multiphasic mixture by adjusting the first pH of the first aqueous phase to the second pH.

3. The biphasic amphiphilic particle of claim 1, wherein the first multiphasic mixture is a water in oil emulsion and the second multiphasic mixture is an oil in water emulsion.

4. The biphasic amphiphilic particle of claim 1, the particle being adapted to cause a phase inversion of an emulsion.

* * * * *

UNITED STATES PATENT AND TRADEMARK OFFICE
CERTIFICATE OF CORRECTION

PATENT NO. : 10,287,376 B2  
APPLICATION NO. : 15/404549  
DATED : May 14, 2019  
INVENTOR(S) : Lee et al.

Page 1 of 1

It is certified that error appears in the above-identified patent and that said Letters Patent is hereby corrected as shown below:

On the Title Page

Item (56), References cited under OTHER PUBLICATIONS, Line 9: Replace "Tang et al., "Large Scale Synthesis of Janus Submicrometer Sized Collids by Seeded Emulsion Polymerization", Macromolecules, vol. 43,, 2010, pp. 5114-5120." with --Tang et al., "Large Scale Synthesis of Janus Submicrometer Sized Colloids by Seeded Emulsion Polymerization", Macromolecules, vol. 43,, 2010, pp. 5114-5120.--.

Item (56), References cited under OTHER PUBLICATIONS, Line 11: Replace "Kim et al.. Synthesis of Nonspherical C olloidal Particles with Anistropic Properties, J. Am Chem. Soc., vol. 128, 2006, pp. 14374-14377." with --Kim et al., Synthesis of Nonspherical Colloidal Particles with Anisotropic Properties, J. Am Chem. Soc., vol. 128, 2006, pp. 14374-14377.--.

Item (56), References cited under OTHER PUBLICATIONS, Line 14: Replace "Kim et al., "Colloid Surfactants for Emulsion Stabilizatin", Adv. Materials, vol. 20, 2008, pp. 3239-3243." with --Kim et al., "Colloid Surfactants for Emulsion Stabilization", Adv. Materials, vol. 20, 2008, pp. 3239-3243.--.

In the Specification

In Column 3, Line 55: Replace "WA" with --tBA--.

In Column 6, Line 56: Replace "believe" with --believed--.

In Column 10, Line 28: Replace "Cert-butyl" with --tert-butyl--.

In Column 11, Line 31: Replace "believe" with --believed--.

In Column 11, Line 55: Replace "believe" with --believed--.

Signed and Sealed this  
Twenty-seventh Day of August, 2019

Andrei Iancu  
*Director of the United States Patent and Trademark Office*